US012363536B2

(12) United States Patent  
Northway et al.

(10) Patent No.: US 12,363,536 B2  
(45) Date of Patent: Jul. 15, 2025

(54) SYSTEMS AND METHODS FOR DETECTING THE SOURCE OR SOURCES OF DENIAL OF SERVICE ATTACKS IN A MOBILE ENVIRONMENT

(71) Applicant: NetScout Systems, Inc., Westford, MA (US)

(72) Inventors: William Northway, Ann Arbor, MI (US); Darren Anstee, Westford, MA (US); Jamie Winquist, Westford, MA (US); Matt Bregger, Westford, MA (US); Michael Kloos, Westford, MA (US)

(73) Assignee: NetScout Systems, Inc., Westford, MA (US)

( * ) Notice: Subject to any disclaimer, the term of this patent is extended or adjusted under 35 U.S.C. 154(b) by 104 days.

(21) Appl. No.: 18/227,889

(22) Filed: Jul. 28, 2023

(65) Prior Publication Data

US 2024/0365121 A1    Oct. 31, 2024

Related U.S. Application Data

(60) Provisional application No. 63/461,862, filed on Apr. 25, 2023.

(51) Int. Cl.
*H04W 12/121* (2021.01)
*H04L 9/40* (2022.01)
(Continued)

(52) U.S. Cl.
CPC ........... *H04W 12/121* (2021.01); *H04L 41/22* (2013.01); *H04L 63/1458* (2013.01); *H04W 24/08* (2013.01)

(58) Field of Classification Search
CPC . H04L 63/1458; H04L 63/1425; H04L 43/04; H04L 43/045; H04L 43/0817;
(Continued)

(56) References Cited

U.S. PATENT DOCUMENTS

2014/0105119 A1    4/2014  Gupta et al.
2017/0201533 A1*   7/2017  Targali ................ H04L 63/1441
(Continued)

FOREIGN PATENT DOCUMENTS

CN     106899608 A  *  6/2017  ............. H04L 43/16
EP     3 783 856 A1     2/2021
EP     3 783 856 B1     1/2023

OTHER PUBLICATIONS

AU Examination Report No. 1 on Australian Application 2024201296, dated Dec. 2, 2024.
(Continued)

*Primary Examiner* — Anh Nguyen
(74) *Attorney, Agent, or Firm* — Foley & Lardner LLP

(57) ABSTRACT

A method for detecting the sources of distributed denial of service attacks is disclosed. Control plane signaling data and user plane data is collected using network monitoring equipment connected to a communications network. The control plane signaling data and user plane data is correlated. Amounts of traffic are calculated for individual computing devices based on the correlated data. One or more computing devices are determined based on the amounts of traffic associated with the one or more computing devices satisfying a device anomaly criterion. A record including a list of the one or more computing devices is generated.

18 Claims, 16 Drawing Sheets

(51) Int. Cl.
*H04L 41/22* (2022.01)
*H04W 24/08* (2009.01)

(58) Field of Classification Search
CPC ..... H04L 43/0876; H04L 43/12; H04L 43/18; H04L 2463/141
See application file for complete search history.

(56) References Cited

U.S. PATENT DOCUMENTS

| | | | | |
|---|---|---|---|---|
| 2021/0051517 A1* | 2/2021 | Johansson | ............. | H04W 28/12 |
| 2021/0329479 A1* | 10/2021 | Al-Dulaimi | ............. | H04L 41/40 |
| 2022/0294820 A1* | 9/2022 | Koral | .................. | H04L 43/0876 |
| 2024/0171676 A1* | 5/2024 | Varada | .................... | H04W 4/16 |

OTHER PUBLICATIONS

EP Article 94(3) EPC Communication dated Oct. 22, 2024 in EP Patent Application No. 24159895.2.
EP Extended Search Report dated May 15, 2024 in European Patent Application No. 24159895.2.
AU Examination Report No. 2 on Australian Application 2024201296, dated Feb. 7, 2025.

* cited by examiner

1200

Alert 2469314 Scratchpad (9)

Traffic Patterns: Clear All

× src net 32.174.0.128/28 and proto tcp and src port 0 and dst net 149.39.0.101/22 and dst port 0

Traffic Elements: Clear All

Protocols:
× tcp (8)

TCP Flags:
× (NULL)

Misuse Types:
× IP Fragmentation (1)
× UDP (9)
× Total Traffic (7)

Mobile Traffic Patterns: Clear All

× IMSI: 12345678901 MSISDN: 8004605500 Provider: Sprint Country: United States
IMEI: 35-161509-123456-7 Device: Google Pixel Mobile Traffic Elements: Clear All

MSISDN:
× 12345678901

Flowspec Elements: Clear All

Source Address:
× tcp (8)

FIG. 12

SYSTEMS AND METHODS FOR DETECTING THE SOURCE OR SOURCES OF DENIAL OF SERVICE ATTACKS IN A MOBILE ENVIRONMENT

CROSS-REFERENCE TO RELATED APPLICATION

This application claims the benefit of priority to U.S. Provisional Application 63/461,862, filed Apr. 24, 2023, the entirety of which is incorporated by reference herein.

BACKGROUND 5G system architecture may facilitate service-based interaction between control plane network functions (NF). Control plane data packets can be used for the exchange of signaling messages and network control between network devices. User plane data packets can be used for the exchange of application data between end-user devices and Internet services.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 4-13 are example user interfaces illustrating data regarding DDoS attacks, in accordance with an implementation;

DETAILED DESCRIPTION

Figure 1:
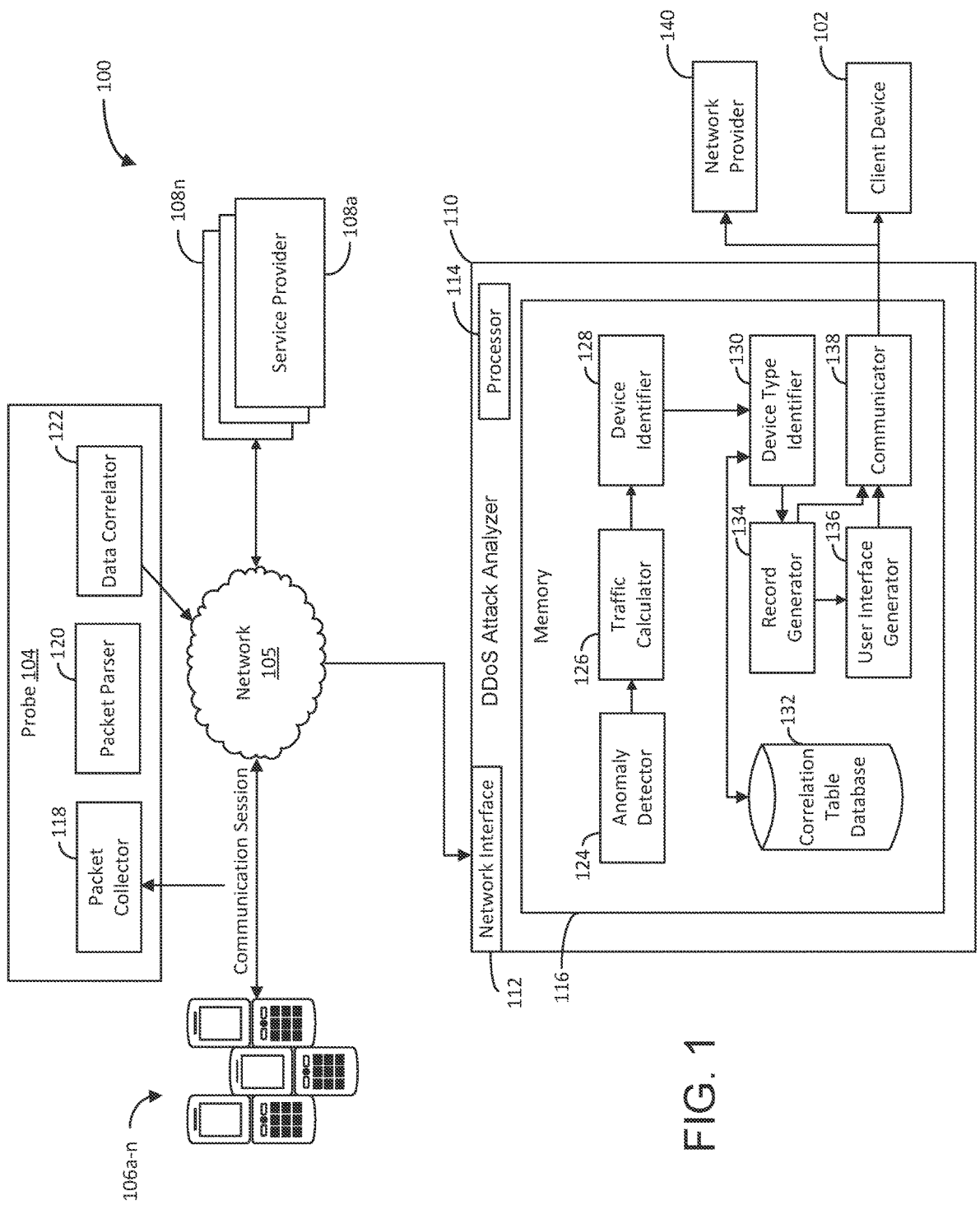
FIG. 1 is an illustration of an example system for distributed denial of service attack (DDoS) source detection, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A network monitoring system may have difficulties establishing the identity of the sources of DDoS or denial of service (DoS) attacks in a mobile environment. For example, the networking monitoring system may include or implement a probe that monitors mobile user-plane conversations. The network monitoring system may learn that there is a DDoS attack (or a DoS attack) on a computing device (e.g., a host computing device) communicating over a network or the network itself. The network monitoring system may learn of the attack by decapsulating the user-plane network traffic and detecting the DDoS attack. However, the network monitoring system may not be able to determine the identity of the source of the DDoS attack in the mobile network because the user-plane network traffic in the mobile network does not contain this information. The identity of the devices communicating over the mobile network is only exchanged across the control plane. Because the network monitoring system may monitor and detect network traffic of communication sessions between many different computing devices, the network monitoring system may not be able to determine which control plane data packets and user plane data packets correspond to the same communication sessions. This deficiency can make it difficult to identify and remediate computing devices that are performing DDoS attacks or violating other Acceptable Use Policies in a mobile networking environment.

A computer implementing the systems and methods described herein may overcome the aforementioned technical deficiencies. For example, a computer monitoring a mobile network can receive an indication or otherwise determine a host computing device or infrastructure component is experiencing a DDoS attack across a network. Responsive to determining the DDoS attack, the computer can identify the computing devices that are involved. For example, a network probe can collect and identify control plane data packets and user plane data packets from communication sessions occurring over the network. The network probe can correlate the control plane data packets and user plane data that correspond to the same communication sessions. The network probe can transmit the correlated data to a computer. From the correlated data, the computer can determine the amount of network traffic with which each computing device in communication across the network is associated (e.g., the number of requests and bits in messages transmitted back and/or forth across the network by the different computing devices). The computer can analyze the correlated data to determine the identities of the individual computing devices that are transmitting the requests and data.

In one example, the computer can identify computing devices that are associated with an amount of traffic that satisfies a device detection criterion (e.g., a threshold). Responsive to identifying the computing devices, the computer can generate a record comprising a list of the identified computing devices and their associated traffic. The computer can present the list on a user interface of a client device or transmit the record with the list to a network provider of the communications network to adjust the network.

In some cases, in addition to or instead of identifying the specific devices that are the source of the DDoS attack, the computer can identify the types of the devices that are the source of the DDoS attack. The computer can do so, for example, by analyzing the correlated data packets of the computing devices the computer identified as being associated with an amount of traffic that satisfies a device detection criterion. The computer can determine the device types from the correlated data packets and calculate the amount of traffic with which the different computing device types are associated. The computer can identify computing device types that are associated with an amount of traffic that satisfies a device type detection criterion. Responsive to identifying the computing device types, the computer can generate a record comprising a list of the identified computing device types. The computer can present (e.g., concurrently present with the list of computing devices determined to be the source of the DDoS attack) the list on a user interface of a client device or transmit the record with the list to a network provider of the communications network to adjust the network.

Accordingly, by implementing the systems and methods described herein, a computer can provide visibility into the sources of DDoS attacks in a communications network. By doing so, a network operator can perform targeted actions to mitigate the threats to the communications network. For example, a mobile network operator (MNO) can promptly block or isolate the offending devices, apply appropriate security policies, and/or collaborate with law enforcement agencies to further investigate and take legal action against the perpetrators. The ability to accurately attribute the malicious activity to specific users/handsets or network infrastructure can empower MNOs with actionable intelligence for effective network security management, leading to improved network performance, enhanced user experience, and strengthened network defenses against malicious activities.

FIG. 1 illustrates an example system 100 for detecting the source of DDoS attacks, in some embodiments. The system 100 may provide improved network monitoring of a mobile communications network to determine computing devices and/or computing device types that are sources of DDoS attacks. In brief overview, the system 100 can include a probe 104 (e.g., network monitoring equipment) that receives and/or stores data packets transmitted via a network 105 between client devices 106a-n (hereinafter client device 106 or client devices 106) and service providers 108a-n (hereinafter service provider 108 or service providers 108). The service providers 108 can each include a set of one or more servers 1402, depicted in FIG. 14A, or a data center 1408. The system 100 can also include a DDoS attack analyzer 110 that can communicate or interface with the probe 104 to determine the computing devices and/or computing device types that are the source or sources of DDoS attacks. The probe 104 can collect control plane signaling and user plane data. The probe 104 can correlate the control plane signaling and user plane data and transmit the correlated data to the DDoS attack analyzer 110. The DDoS attack analyzer 110 can receive the correlated control plane signaling and user plane data from the probe 104. The DDoS attack analyzer 110 can analyze the correlated data. Based on the analysis, the DDoS attack analyzer 110 can identify the source or sources of DDoS attacks. The DDoS attack analyzer 110 can generate a user interface illustrating a list of computing devices that the DDoS attack analyzer 110 determined to be the sources of a DDoS attack. As described herein, each reference to a DDoS attack can be a reference to a DoS attack.

The probe 104, the client devices 106, the service providers 108, the client device 102, and/or the DDoS attack analyzer 110 can include or execute on one or more processors or computing devices (e.g., the computing device 1403 depicted in FIG. 14C) and/or communicate via the network 105. The network 105 can include computer networks such as the Internet, local, wide, metro, or other area networks, intranets, satellite networks, and other communication networks such as voice or data mobile telephone networks. The network 105 can be used to access information resources such as web pages, websites, domain names, or uniform resource locators that can be presented, output, rendered, or displayed on at least one computing device (e.g., client device 106), such as a laptop, desktop, tablet, personal digital assistant, smartphone, portable computers, or speaker. In some embodiments, the network 105 may be or include a self-organizing network that implements a machine learning model to automatically adjust connections and configurations of network elements of the network 105 to optimize network connections (e.g., minimize latency, reduce dropped calls, increase data rate, increase quality of service, etc.).

Each of the client device 102, the probe 104, the client devices 106, the service providers 108, and/or the DDoS attack analyzer 110 can include or utilize at least one processing unit or other logic device such as programmable logic array engine, or module configured to communicate with one another or other resources or databases. The components of the client device 102, the probe 104, the client devices 106, the service providers 108, and/or the DDoS attack analyzer 110 can be separate components or a single component. The system 100 and its components can include hardware elements, such as one or more processors, logic devices, or circuits.

Still referring to FIG. 1, and in further detail, the system 100 can include the service providers 108. The service providers 108 may each be or include servers or computers configured to transmit or provide services across network 105 to client devices 106. The service provider 108 can be or include host computing devices. The service providers 108 may transmit or provide such services upon receiving requests for the services from any of the client devices 106. The term "service" as used herein includes the supplying or providing of information over a network, and is also referred to as a communications network service. Examples of services include 5G broadband services, any voice, data, or video service provided over a network, smart-grid network, digital telephone service, cellular service, Internet protocol television (IPTV), etc.

The client devices 106 can include or execute applications to receive data from the service providers 108. For example, a client device 106 may execute a video application upon receiving a user input selection that causes the client device 106 to open the video application on the display. Responsive to executing the video application, a service provider 108 associated with the video application may stream a requested video to the client device 106 in a communication session. In another example, a client device 106 may execute a video game application. Responsive to executing the video game application, a service provider 108 associated with the video game application may provide data for the video game application to the client device 106. The client devices 106 may establish communication sessions with the service providers 108 for any type of application or for any type of call. The client devices 106 can be host computing devices, in some cases.

A client device 106 can be located or deployed at any geographic location in the network environment depicted in FIG. 1. A client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 1410 depicted in FIG. 14B). If the client device 106 is deployed in a cloud 1410, the client device 106 can include or be referred to as a virtual client device or virtual machine. In the event the client device 106 is deployed in a cloud 1410, the packets exchanged between the client device 106 and the service providers 108 can still be retrieved by probe 104 from the network 105. The client device 102 may be similar to client devices 106. In some cases, the probe 104, the client devices 106, and/or the DDoS attack analyzer 110 can be deployed in the cloud 1410 on the same computing host in an infrastructure 1416 (described below with respect to FIG. 14).

As service providers 108 provide or transmit data in communication sessions to client devices 106, the probe 104 may monitor the control plane signaling data (e.g., control plane signaling data packets) of the communication sessions. The probe 104 may collect control plane signaling data at an Evolved/Next-Generation Packet Core interface (e.g., the S11-interface or the N4 interface) of the network 105. The control plane signaling data may include a cell identifier identifying the cell in which the respective client device 106 was located while transmitting or receiving the data, a device identifier (e.g., IMSI, MSISDN, IMEI etc.) of the client device 106, a service and, in 5G, a slice identifier for the client device 106. The probe 104 may also be connected to a core interface (e.g., an S1-U logical interface) of the network 105 to collect user plane data. The probe 104 may receive and correlate the user plane and control plane traffic. The probe 104 can forward the correlated traffic to the DDoS attack analyzer 110 over the network 105 for further processing.

For example, the probe 104 can include a packet collector 118, a packet parser 120, and a data correlator 122. The packet collector 118 can comprise programmable instructions that, upon execution, cause a processor of the probe 104 to collect user plane data (e.g., user plane data packets) and control plane data (e.g., control plane data packets). The packet collector 118 may collect the user plane data, for example, via the S1-U or N3 logical interface. The packet collector 118 may collect control plane data, for example, via the S11-interface or the N4 interface.

The packet collector 118 may store the data packets and/or content of the data packets in memory of the probe 104. The packet collector 118 may extract all data or specific data (e.g., data the packet collector 118 identifies in the data packets according to a set of rules) from each data packet and store the extracted data in the memory 116. In some embodiments, the packet collector 118 stores the entire data packets in the memory 116. The packet collector 118 may store such data packets from multiple communication sessions between different nodes. In doing so, the packet collector 118 may store identifiers (e.g., strings) of nodes involved in the communication sessions with the respective data packets and/or for the communication sessions themselves. The packet parser 120 may retrieve the data packets and/or the data extracted from the data packets from the memory 116. The packet parser 120 may do so to identify the identifiers and/or other data from the data packets that can be used to correlate the data.

The packet parser 120 may comprise programmable instructions that, upon execution, cause the processor 114 to parse or extract data from the control plane data packets and/or the user plane data packets. The packet parser 120 can be configured to analyze the headers of the data packets to identify different identifiers of the data packets. For example, the packet parser 120 can be configured to identify the international mobile subscriber identity (IMSI), the international mobile equipment identity (IMEI), and tunnel identifications from data packets collected by the packet collector 118. The packet parser 120 can identify such identifiers, for example, from control plane data packets collected during the network authentication, authorization, and/or session establishment operations when client devices 106 connect with service provider 108 over the network 105. The packet parser 120 can identify tunnel identifiers from control plane data packets and/or user plane data packets.

The data correlator 122 may comprise programmable instructions that, upon execution, cause the processor 114 to correlate user plane data (e.g., user plane data packets) with control plane data (e.g., control plane data packets). The data correlator 122 can correlate the data using data structures or records for communication sessions, for example. In some embodiments, the data correlator 122 can correlate control plane data with user plane data based on common, for example, tunnel identifier. For example, the data correlator 122 can collect or identify control plane data packets and user plane data packets collected by the packet collector 118. The data correlator 122 can identify tunnel identifiers from the control plane data packets and/or the user plane data packets. Unique tunnel identifiers can correspond with individual communication sessions (e.g., flows). Responsive to identifying a unique tunnel identifier (e.g., tunnel identifiers that the data correlator 122 has not identified before or has not identified within a time threshold), the data correlator 122 can generate a record or data structure (e.g., table or file) that includes the tunnel identifier. The tunnel identifier can be the identifier for a communication session between a client device 106 and a service provider 108. The data correlator 122 can identify user plane data packets and control plane data packets that contain or include the tunnel identifier and assign the data packets to the record or data structure the data correlator 122 established for the communication session. The data correlator 122 can extract data from the assigned data packets (e.g., from the payloads of the data packets) and insert the extracted data into the record or data structure that corresponds to the communication session. In some cases, the data correlator 122 can store the data packets in the record or data structure that corresponds to the data packets. The data correlator 122 can store any data of data packets in data structures or records for communication sessions. In this way, the data correlator 122 can correlate user plane data packets and control signaling data packets that correspond to the same communication sessions together.

For example, a client device 106 and a service provider 108 may establish a communication session. The client device 106 and the service provider 108 can communicate over the communication session by transmitting data packets between each other. The data packets can include a tunnel identifier for the communication session. The data correlator 122 can identify the tunnel identifiers in the data packets and generate a record or data structure for the communication session. The data correlator 122 can identify the data packets that correspond with the communication session based on the tunnel identifiers in the data packets. The data correlator 122 can extract data (e.g., the contents of the payloads and/or headers) from the data packets and/or the metadata (e.g., the number of bytes included in the individual data packets, timestamps indicating the times the data packets were transmitted or received, etc.) from the data packets. The data correlator 122 can store the extracted data or metadata in the record or data structure. In one example, the data correlator 122 can store the IMSIs and IMEIs of the computing devices in the communication sessions in the records or data structures for the communication sessions. In some embodiments, the data correlator 122 can extract data from the IMSIs (e.g., mobile country code (MCC), mobile network code (MNC), and subscriber identification) and IMEIs (e.g., type allocation code (TAC), serial number (SNR), and/or software version (SVR)) and store the extracted data in the records or data structures for the corresponding communication sessions. In some cases, the data correlator 122 can store the data packets themselves in the record or data structure. The data correlator 122 can similarly store records or data structures for any number of communication sessions. The data correlator 122 can transmit such records or data structures to the DDoS attack analyzer 110 for further processing.

The DDoS attack analyzer 110 may comprise one or more processors that are configured to receive correlated control and user plane telemetry. The DDoS attack analyzer 110 may comprise a network interface 112, a processor 114, and/or memory 116. The DDoS attack analyzer 110 may communicate with the probe 104. The processor 114 may be or include an ASIC, one or more FPGAs, a DSP, circuits containing one or more processing components, circuitry for supporting a microprocessor, a group of processing components, or other suitable electronic processing components. In some embodiments, the processor 114 may execute computer code or modules (e.g., executable code, object code, source code, script code, machine code, etc.) stored in the memory 116 to facilitate the operations described herein. The memory 116 may be any volatile or non-volatile computer-readable storage medium capable of storing data or computer code.

The memory 116 may include an anomaly detector 124, a traffic calculator 126, a device identifier 128, a device type identifier 130, a correlation table database 132, a record generator 134, a user interface generator 136, and a communicator 138, in some embodiments. In brief overview, the components 118-138 may monitor communication sessions between client devices 106 and service providers 108 over the network 105. In doing so, the components 118-138 can collect correlated control and user plane telemetry from the probe 104. The components 118-138 can determine when there is a DDoS attack or other Acceptable Use Policy violation occurring. The components 118-138 can determine which of the client devices 106 is the source or destination of the DDoS attack based on the correlated data. The components 118-138 can generate a user interface illustrating the source. The components 118-138 can present the user interface at the client device 102 or transmit the list to the network provider 140 for network reconfiguring.

The packet collector 118 may comprise programmable instructions that, upon execution, cause the probe 104 to receive or collect data being transmitted across the network 105. The packet collector 118 may collect control plane signaling data (e.g., data packets) and/or user plane data (e.g., data packets) from communication sessions occurring over the network 105.

The anomaly detector 124 may comprise programmable instructions that, upon execution, cause the processor 114 to detect or determine anomalies at one or more computing devices or in the network 105. An anomaly can be a cyberattack, such a DDoS attack or another type of Acceptable Use Policy violation at a computing device or a network. The anomaly detector 124 can detect anomalies at computers (e.g., service providers 108) hosting services for different client devices 106 or that are otherwise associated with the network 105. The anomaly detector 124 can detect anomalies at the network 105 itself. The anomaly detector 124 can detect an anomaly, for example, by analyzing the correlated control and user plane telemetry for each communication session that involves a specific service provider 108 or specific client device 106. For example, the anomaly detector 124 can determine a service provider 108 or client device 106 receives a number of requests (e.g., requests identifying a webpage or website hosted by an attacked service provider 108) above a threshold, provides a number of responses to such requests above a threshold, provides an amount of data in data packets above a threshold, etc. In some cases, the anomaly detector 124 can detect such attacks responsive to determining a specific Internet Protocol address or group of Internet Protocol addresses transmits such requests or receives such data from a client device 106 or service provider 108 above a corresponding threshold. The anomaly detector 124 can detect anomalies by identifying and analyzing the records or data structures of correlated data for communication sessions involving specific client devices 106 or service providers 108 generated by the data correlator 122 at the probe 104.

In some cases, instead of determining DDoS attacks by analyzing records or data structures of correlated data, the anomaly detector 124 receives a message indicating a DDoS attack. For example, a service provider 108 may be experiencing a DDoS attack. Responsive to the service provider 108 determining the service provider 108 is experiencing a DDoS attack, the service provider 108 can transmit a message to the DDoS attack analyzer 110 indicating the DDoS attack. The message can include an identification of the service provider 108 experiencing the attack and details of the traffic involved. The anomaly detector 124 can receive the message and identify the service provider 108 experiencing the DDoS attack based on the identification of the service provider 108 in the message.

The traffic calculator 126 may comprise programmable instructions that, upon execution, cause the processor 114 to determine or calculate amounts of traffic that are associated with individual client devices 106. The traffic calculator 126 can calculate the amounts of traffic, for example, in response to the anomaly detector 124 detecting a DDoS attack at a service provider 108 or the network 105. The traffic calculator 126 can calculate amounts of traffic that are associated with computing devices that are in communication with the service provider 108 or network 105 that is experiencing the DDoS attack. For example, responsive to the traffic calculator 126 detecting a DDoS attack at a service provider 108 or the network 105, the anomaly detector 124 can identify the records or data structures stored in the memory 116 for communication sessions involving the attacked service provider 108 or network 105. The traffic calculator 126 can do so, for example, by identifying the records or data structures that include an identifier (e.g., an IP address, a MAC address, an IMSI, an IMEI, or any other identifier) of the attacked service provider 108 or network 105. The traffic calculator 126 can identify each record or data structure that includes an identifier of the attacked service provider 108 or network 105 and analyze the data in the records to determine amounts of network traffic (e.g., number of requests, rate of data packets transfer (e.g., kilo packets per second), the amount of data transfer (e.g., bits, bytes, kilobytes, etc.), rate of data transfer (e.g., bits per second, bytes per second, kilobytes per second, etc.), etc.) for the records. Each record can correspond to a different client device 106 as the other computing device in the communication session corresponding to the record with the attacked service provider 108 or network 105. Accordingly, the traffic calculator 126 can calculate amounts of traffic that correspond with each of one or more computing devices (e.g., client devices 106) in communication with the attacked service provider 108 or network 105.

The traffic calculator 126 may calculate amounts of traffic for computing devices for a DDoS attack for a defined time period. The defined time period can be a moving time window or a static time window. The defined time period can be a defined amount of time from the time the anomaly detector 124 detected the DDoS attack at the attacked service provider 108 or network 105. The traffic calculator 126 can identify the data packets or data for computing devices in communication with the attacked service provider 108 or network 105 with timestamps within the defined time period and calculate the amounts of traffic for the computing devices from the identified data packets. By doing so, the traffic calculator 126 can normalize calculations to detect anomalies.

The traffic calculator 126 can maintain and increment byte and packet counts to determine the amount of network traffic for individual client devices 106 in communication with the attacked service provider 108 or network 105. The counts can be compared to defined thresholds or dynamic thresholds that have been calculated over time (e.g., based on historical data, as described herein).

The device identifier 128 may comprise programmable instructions that, upon execution, cause the processor 114 to identify computing devices that are (or are likely) the sources of a DDoS attack. The device identifier 128 can identify amounts of traffic for the individual client devices 106 in communication with the attacked service provider 108 or network 105 as calculated by the traffic calculator 126. The device identifier 128 can compare the amounts of traffic to one or more device anomaly criteria. An example of such device anomaly criteria can include a threshold (e.g., a traffic threshold or a network traffic threshold). In some embodiments, the device identifier 128 can compare the amounts of traffic with each other. The device identifier 128 can identify a defined number of the highest amounts of traffic based on the comparison as satisfying the device anomaly criteria. In one example, the device identifier 128 can rank the different computing devices based on the amount of traffic associated with each computing device. The device identifier 128 can identify or select a defined number of the highest-ranked computing devices (e.g., the computing devices associated with the highest amounts of traffic). In some cases, the device identifier 128 can compare the amounts of traffic to a threshold. The device identifier 128 may select or only select computing devices that are associated with an amount of traffic exceeding the threshold to avoid improper identification of the source of a DDoS attack. The device identifier 128 can apply any rules or criteria to the amounts of traffic. The device identifier 128 can identify the computing devices associated with amounts of traffic that correspond with satisfied criteria as being the sources or likely sources of the DDoS attack on the attacked service provider 108 or network 105.

In some embodiments, the device identifier 128 can use thresholds that are specific to individual service providers 108 to determine which devices are the sources of DDoS attacks. For example, the device identifier 128 can determine baselines (e.g., averages or moving averages based on a dynamic time window) for the amount of traffic the individual service providers 108 receive or are otherwise associated with. The device identifier 128 can determine such baselines based on historical data (e.g., based on the amount of traffic the individual service providers 108 have received within a defined time period or range). The device identifier 128 can determine a threshold for each service provider 108 as a function of the baselines (e.g., by aggregating or multiplying the baselines by a defined value or a standard deviation). The device identifier 128 can periodically update the thresholds at set intervals, enabling the device identifier 128 to account for changes in content or popularity of the services provided by service providers 108 when determining sources of DDoS attacks.

The device identifier 128 can identify the computing devices associated with amounts of traffic that satisfy device type anomaly criteria. Such identifiers can be the IMSIs, IMEIs, IP addresses, MAC addresses, etc. The device identifier 128 can identify the identifiers from the data packets or extracted data of the records or data structures for the communication sessions between the computing devices associated with the amount of traffic satisfying device type anomaly criteria and the attacked service provider 108 or network 105. The device identifier 128 can identify the records or data structures of such computing devices and retrieve one or more of the identifiers of the computing devices from the records. In this way, the device identifier 128 can identify the individual computing devices that are or may be responsible for the DDoS attack on the attacked service provider 108 or network 105.

The device type identifier 130 may comprise programmable instructions that, upon execution, cause the processor 114 to identify types of computing devices that are (or are likely) the sources of a DDoS attack. The device type identifier 130 can determine the types of computing devices that are in communication with the attacked service provider 108 or network 105. A type of computing device can be the make and/or model of a computing device. The device type identifier 130 can determine types of computing devices for individual computing devices, for example, based on values in the data packets transmitted between the computing devices and the attacked service provider 108 or network 105. For instance, the device type identifier 130 can be configured to determine types of computing devices based on type allocation codes (TACs) in the IMEIs of the data packets transmitted between the attacked service provider 108 or network 105. The device type identifier 130 can identify the TACs of the client devices 106 in communication sessions with the attacked service provider 108 or network 105. The device type identifier 130 can compare the TACs with a table or data structure in the correlation table database 132 that includes stored associations (e.g., common rows) between TACs and types of computing devices. The device type identifier 130 can identify the types of computing devices of the individual communication sessions between the client devices 106 and the attacked service provider 108 or network 105 based on the TACs of the client devices 106 matching TACs stored in the table.

The correlation table database 132 can be a database (e.g., a relational database) stored in the memory 116 that indicates relationships between TACs and types of computing devices. The correlation table database 132 can store the relationship in a one-to-many or a one-to-one configuration. In some embodiments, the correlation table database 132 can be synchronized with an external database that is updated over time (e.g., updated as new device types come to market or device types change TACs). The correlation table database 132 can store any number of relationships between types of computing devices and TACs. The correlation table database 132 can include other correlations between subsets of values of IMSIs and IMEIs. For example, the correlation table database 132 can store correlations between values in the IMSIs and/or IMEIs and device manufacturers, device models, device version numbers, and/or subscriber data, such as country and/or network provider. The DDoS attack analyzer 110 can use such correlations to determine amounts or characteristics of computing devices that are the sources of DDoS attacks.

Responsive to determining the types of computing devices of the computing devices (e.g., the computing devices in communication with the service provider 108), the device type identifier 130 may determine the types of computing devices that are the source or are likely the source of the DDoS attack on the attacked service provider 108 or network 105. For example, the device type identifier 130 can identify the amounts of traffic that correspond with the computing devices in communication with the attacked service provider 108 or network 105. The device type identifier 130 can identify the types of computing devices of the computing devices that are associated with the amounts of traffic. The device type identifier 130 can aggregate the amounts of traffic that correspond with each of the types of computing devices such that the device type identifier 130 determines an aggregate amount of traffic for each type of computing device (e.g., computing device type). The device type identifier 130 can compare the aggregate amounts of traffic to one or more device type anomaly criteria. An example of such device type anomaly criteria can be a threshold (e.g., a device type threshold). In some embodiments, the device type identifier 130 can compare the aggregate amounts of traffic with each other. The device type identifier 130 can identify a defined number of the highest aggregate amounts of traffic based on the comparison as satisfying the device type anomaly criteria. In one example, the device type identifier 130 can rank the different types of computing devices based on the aggregate amount of traffic associated with each type of computing device. The device type identifier 130 can identify a defined number of the highest-ranked types of computing devices (e.g., the types of computing devices associated with the highest aggregate amounts of traffic). In some cases, the device type identifier 130 can compare the amounts of traffic to a threshold. The device type identifier 130 may select or only select computing devices that are associated with an aggregate amount of traffic exceeding the threshold to avoid improper identification of the source of a DDoS attack. The device type identifier 130 can apply any rules or criteria to the aggregate amounts of traffic. The device type identifier 130 can identify the types of computing devices associated with aggregate amounts of traffic that correspond with satisfied criteria as being the sources or likely the sources of the DDoS attack on the attacked service provider 108 or network 105.

The record generator 134 may comprise programmable instructions that, upon execution, cause the processor 114 to generate a record (e.g., a file, document, table, listing, message, notification, etc.). The record generator 134 can generate a record to include the list of computing devices identified by the device identifier 128 as the source or likely the source of the DDoS attack on the attacked service provider 108 or network 105. The record generator 134 can additionally or instead include the list of types of computing devices identified by the device type identifier 130 as the source or likely the source of the DDoS attack. In some embodiments, the record generator 134 can include the amounts of traffic that correspond to or are associated with each of the computing devices on the list of computing devices and/or the types of computing devices on the list of the types of computing devices. The record generator 134 can include data regarding the DDoS attack in the record.

In some embodiments, the record generator 134 can determine network carriers that are the source or potential source of a DDoS attack. For example, the record generator 134 can pattern match different values in the headers of the data packets, such as in the IMSI, MNC, MSISDN, or IP address of the data packets with a table in the correlation table database 132. The table may include one or more stored associations between such values and different network carriers (e.g., network carrier A, network carrier B, network carrier C, etc.). The record generator 134 can determine network carriers for the individual communication sessions to be the network carriers of the computing devices communicating with the attacked service provider 108 or network 105. The record generator 134 can assign the network carriers to the respective communication session by inserting identifiers of the network carriers into the different data structures that correspond to the same communication sessions as the data structures.

The record generator 134 may determine the network carriers that are the source or are likely the source of the DDoS attack on the attacked service provider 108 or network 105. For example, the record generator 134 can identify the amounts of traffic that correspond with the computing devices in communication with the attacked service provider 108 or network 105. The record generator 134 can identify the network carriers of the computing devices that are associated with the amounts of traffic (e.g., identify from the identifiers of network carriers in the data structures). The record generator 134 can aggregate the amounts of traffic that correspond with each of the network carriers such that the record generator 134 determines an aggregate amount of traffic for each network carrier. The record generator 134 can compare the aggregate amounts of traffic to one or more network carrier anomaly criteria. An example of such network carrier anomaly criteria can be a threshold (e.g., a device type threshold). In some embodiments, the record generator 134 can compare the aggregate amounts of traffic with each other. The record generator 134 can identify a defined number of the highest aggregate amounts of traffic based on the comparison as satisfying the network carrier anomaly criteria. In one example, the record generator 134 can rank the network carriers based on the aggregate amount of traffic associated with each network carrier. The record generator 134 can identify a defined number of the highest-ranked network carriers (e.g., the network carriers associated with the highest aggregate amounts of traffic). In some cases, the record generator 134 can compare the amounts of traffic to a threshold. The record generator 134 may select or only select network carriers that are associated with an aggregate amount of traffic exceeding the threshold to avoid improper identification of the source of a DDoS attack. The record generator 134 can apply any rules or criteria to the aggregate amounts of traffic. The record generator 134 can identify the network carriers associated with aggregate amounts of traffic that correspond with satisfied criteria as being the sources or likely the sources of the DDoS attack on the attacked service provider 108 or network 105. The record generator 134 can generate a record including a list of the network carriers identified as being the source of the DDoS attack on the attacked service provider 108 or network 105.

The user interface generator 136 may comprise programmable instructions that, upon execution, cause the processor 114 to generate a user interface from the data in the record generated by the record generator 134. The user interface generator 136 can generate the user interface to include one or more of the list of computing devices identified as the source of the DDoS attack, the list of types of computing devices identified as the source of the DDoS attack, or the list of network carriers identified as the source of the DDoS attack. The user interface generator 136 can include each list as separate widgets (e.g., tables or graphical elements) within the user interface.

The user interface generator 136 can include the list of computing devices to have different data about each computing device. For example, for each computing device on the list of computing devices, the user interface generator 136 can include an IMSI, a Mobile Station Integrated Services Digital Network (MSISDN), a network provider, a country, an IMEI, a device type, and amount of traffic associated with the computing device. The user interface generator 136 can retrieve such data from the record generated by the record generator 134 and/or from the data structure or record generated from data packets of each computing device. In some embodiments, the user interface generator 136 can include a percentage and/or a graphic indicating a percentage, such as a bar, next to each computing device of the list. The percentage can indicate the portion of network traffic that the corresponding computing device is responsible for with the attacked service provider 108 or network 105. The user interface generator 136 (or any other component in the memory 116) can determine such percentages, for example, by identifying the amounts of traffic associated with each computing device, aggregating the amounts of traffic, and dividing the amount of traffic for each computing device on the list by the aggregated amount of traffic.

The user interface generator 136 can include the list of types of computing devices to have different data about each type of computing device on the user interface. For example, for each type of computing device on the list of types of computing devices, the user interface generator 136 can include a TAC for the type of computing device and an amount of traffic associated with the type of computing device. The user interface generator 136 can retrieve such data from the record generated by the record generator 134 and/or calculate such data from the data structure or record generated from data packets of each computing device. In some embodiments, the user interface generator 136 can include a percentage and/or a graphic indicating a percentage, such as a bar, next to each type of computing device of the list. The percentage can indicate the portion of network traffic that the corresponding type of computing device is responsible for with the attacked service provider 108 or network 105. The user interface generator 136 (or any other component in the memory 116) can determine such percentages, for example, by identifying the amounts of traffic associated with each type of computing device, aggregating the amounts of traffic, and dividing the amount of traffic for each type of computing device on the list by the aggregated amount of traffic. The user interface generator 136 can include the widgets including the list of computing devices and the list of types of computing devices and the corresponding data for each widget in the same user interface. Accordingly, when the DDoS attack analyzer 110 presents the user interface on a display, such as on a display of a remote computer (e.g., the client device 102), the lists can be presented concurrently.

The user interface generator 136 can include the list of network carriers to have different data about each network carrier on the user interface. For example, for each network carrier on the list of network carriers, the user interface generator 136 can include an amount of traffic associated with the network carrier. The user interface generator 136 can retrieve such data from the record generated by the record generator 134 and/or calculate such data from the data structures or records generated from data packets of each computing device or communication session. In some embodiments, the user interface generator 136 can include a percentage and/or a graphic indicating a percentage, such as a bar, next to each network carrier of the list. The percentage can indicate the portion of network traffic that the corresponding network carrier is responsible for with the attacked service provider 108 or network 105. The user interface generator 136 (or any other component in the memory 116) can determine such percentages, for example, by identifying the amounts of traffic associated with each network carrier, aggregating the amounts of traffic, and dividing the amount of traffic for each network carrier on the list by the aggregated amount of traffic.

The communicator 138 may be or comprise executable instructions that, upon execution by the processor 114, may export notifications of computing devices and/or types of computing devices that the DDoS attack analyzer 110 identified as being a source of a DDoS attack. For example, the communicator 138 may create notification from the record generated by the record generator 134 and/or the user interface generated by the user interface generator 136. The communicator 138 can transmit the notification to the client device 102 for display. The communicator 138 may transmit the notification to the client device 102 or the network provider 140 responsive to a request from the client device 102 or the network provider 140. The communicator 138 can transmit the user interface to the client device 102, such as for display at the client device 102. The communicator 138 can transmit the record to the network provider 140, such as to use to control or adjust the network 105 to improve network performance. The DDoS attack analyzer 110 can generate and/or transmit such records and/or user interfaces for each DDoS attack that the anomaly detector 124 detects. The communicator 138 can be an application programming interface (API).

The network provider 140 can reorganize the network 105 according to the notifications of the one or more computing devices or the notification of types of computing devices. For example, the network provider 140 can throttle (e.g., stop or limit) any requests from the computing devices or types of computing devices included in the notifications. The network provider 140 can reorganize the network in any way based on the notifications. In one example, responsive to identifying the individual computing devices that are the cause of a DDoS attack, the network provider 140 can mitigate traffic by targeting (e.g., throttling) only those devices. However, if all of the computing devices in an attack share some common pattern (e.g., all devices have a device type A based on the TAC, or all of the computing devices have a network provider A based on MNC) then there may be other actions or a wider mitigation that is available.

Figure 2:
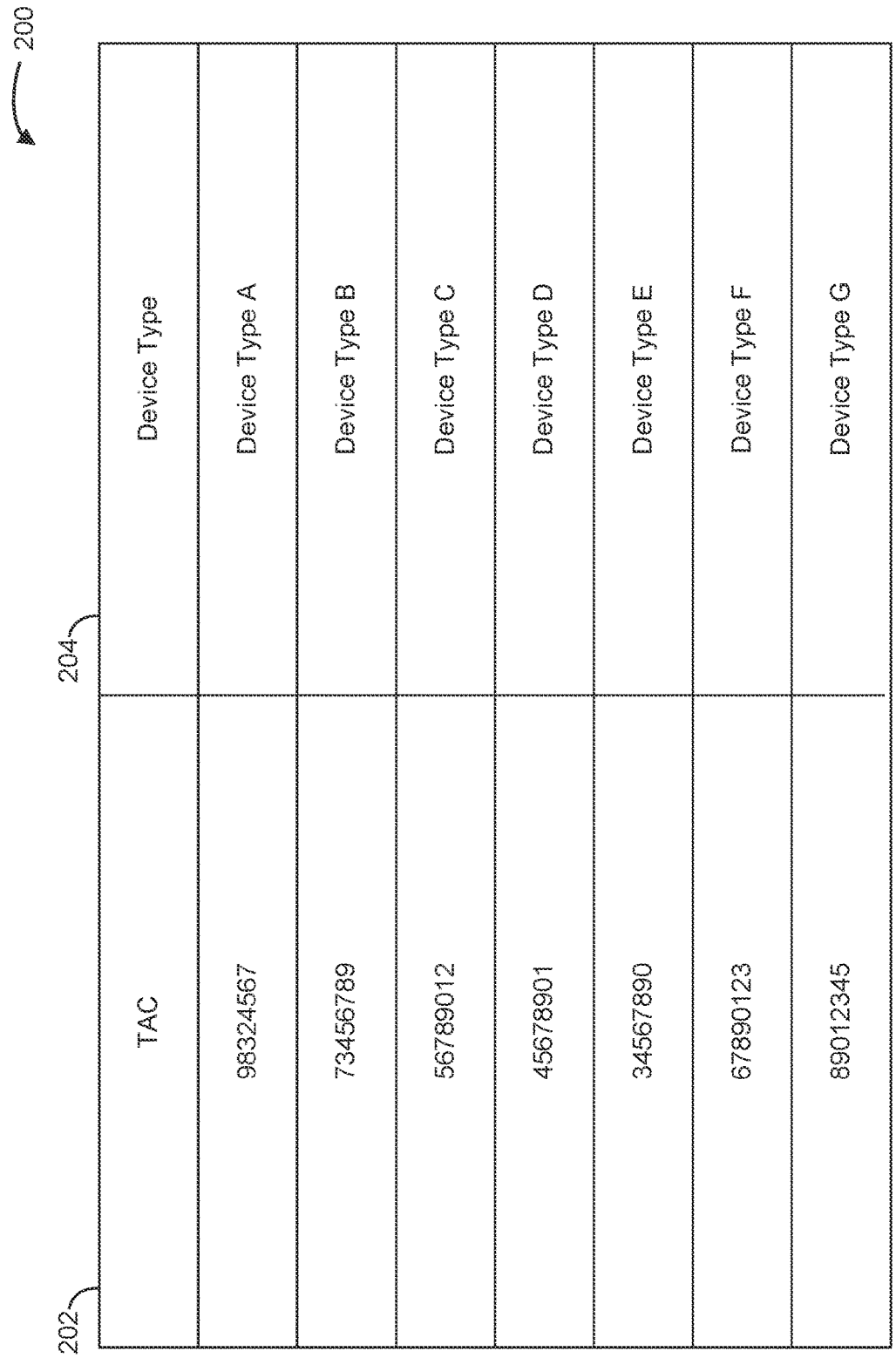
FIG. 2 is an example table for DDoS source detection, in accordance with an implementation.

FIG. 2 is an example table 200 for DDoS source detection, in accordance with an implementation. The table 200 can be an example of a table that can be stored in the correlation table database 132, shown and described with reference to FIG. 1. The table 200 can include a TAC column 202 and a device type column 204. The table 200 can include one or more rows that each include a value in the TAC column 202 and the device type column 204. The values in the TAC column 202 can be TAC's from IMEIs of computing devices (e.g., the client devices 106, or mobile computing devices).

The values in the device type column 204 can be identifications of different device types (e.g., the make and/or model of a computing device). A TAC in the same row as a device type can indicate that a computing device with the TAC may have the device type in the same row as the TAC. A data processing system (e.g., the DDoS attack analyzer 110) can determine the types of computing devices that transmitted individual data packets based on the TACs in the data packets by comparing the TACs from the data packets to the table 200 or a table similar to the table 200.

Figure 3:
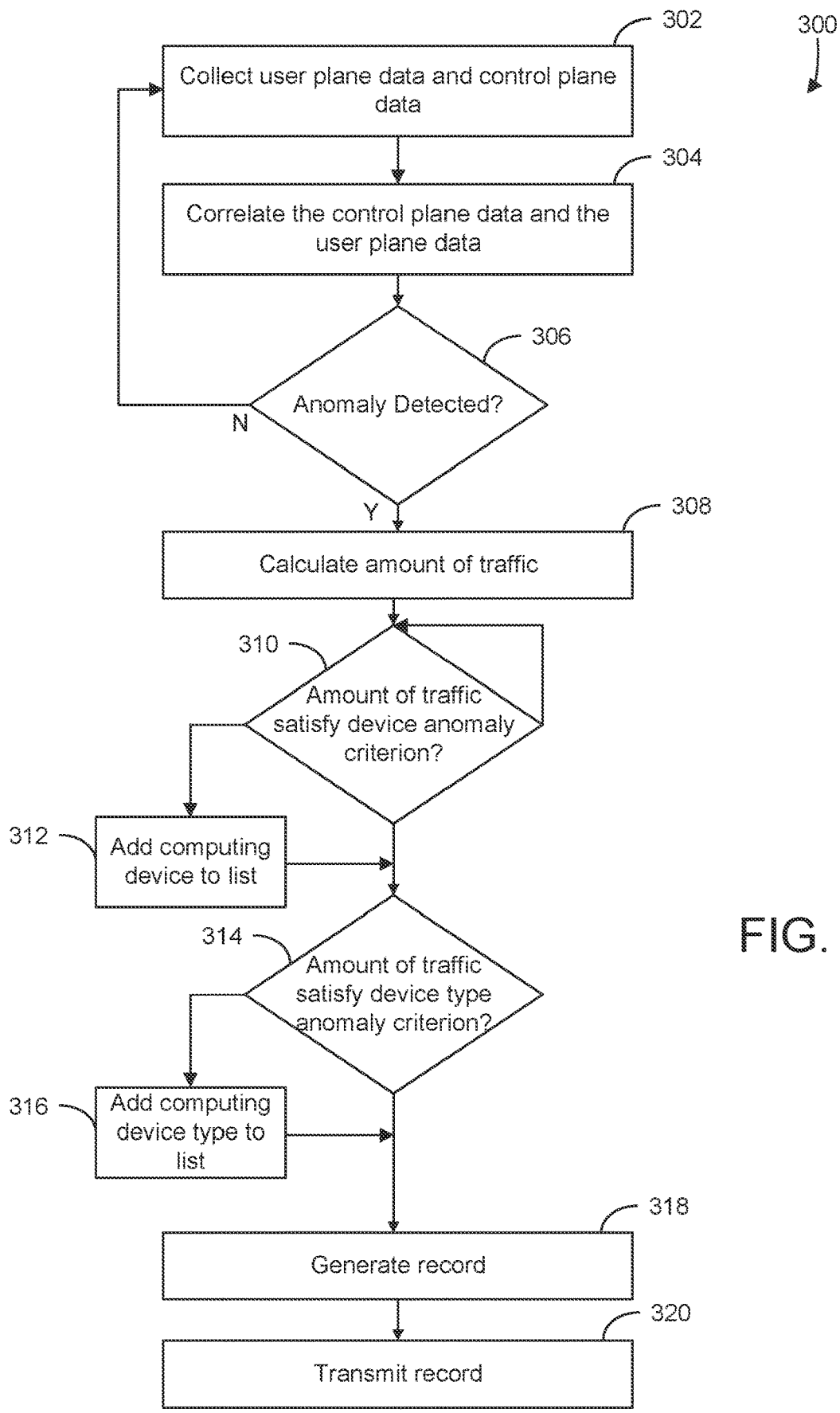
FIG. 3 is an example method for DDoS source detection, in accordance with an implementation.
Figure 4:
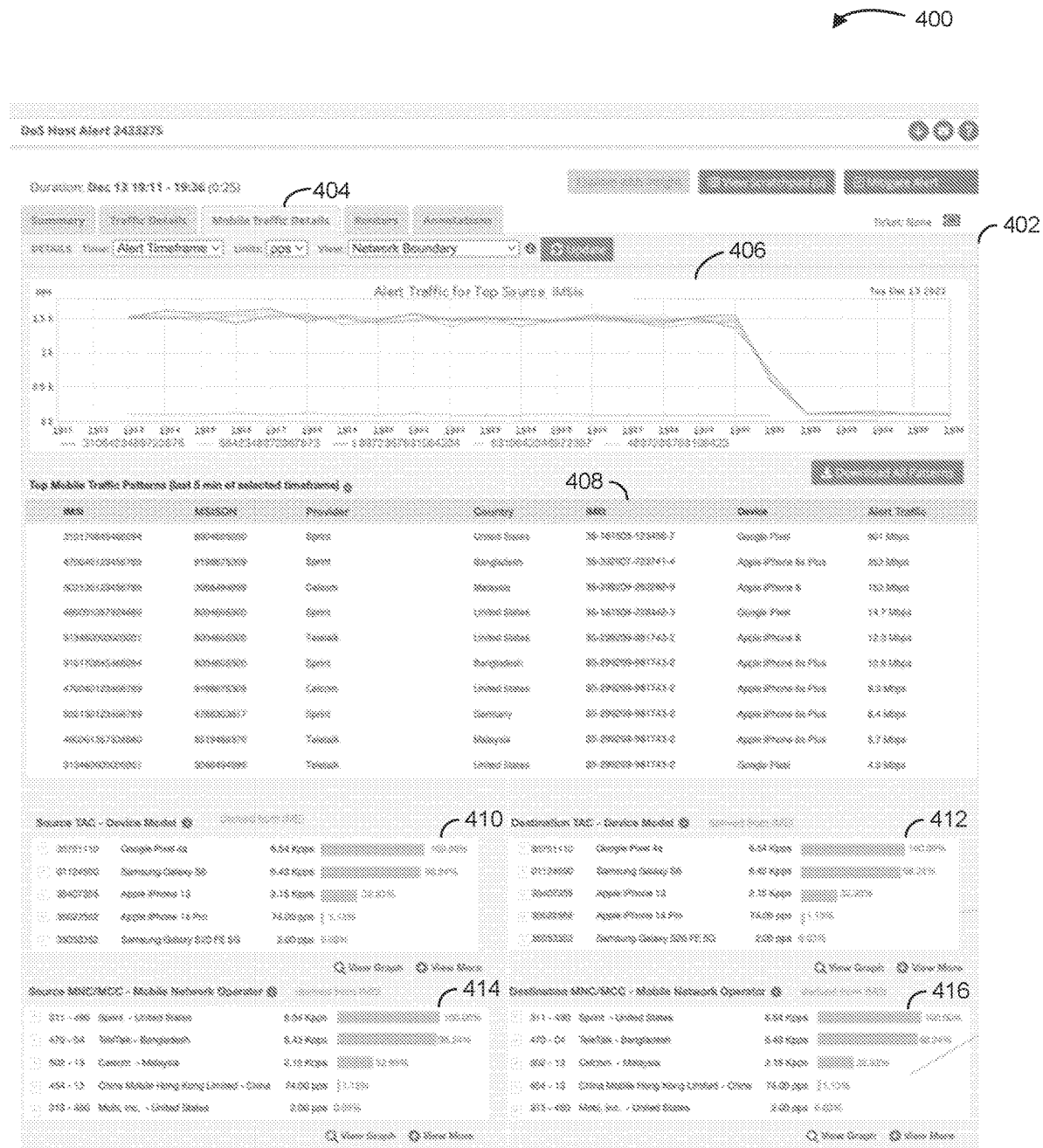
Figure 5:
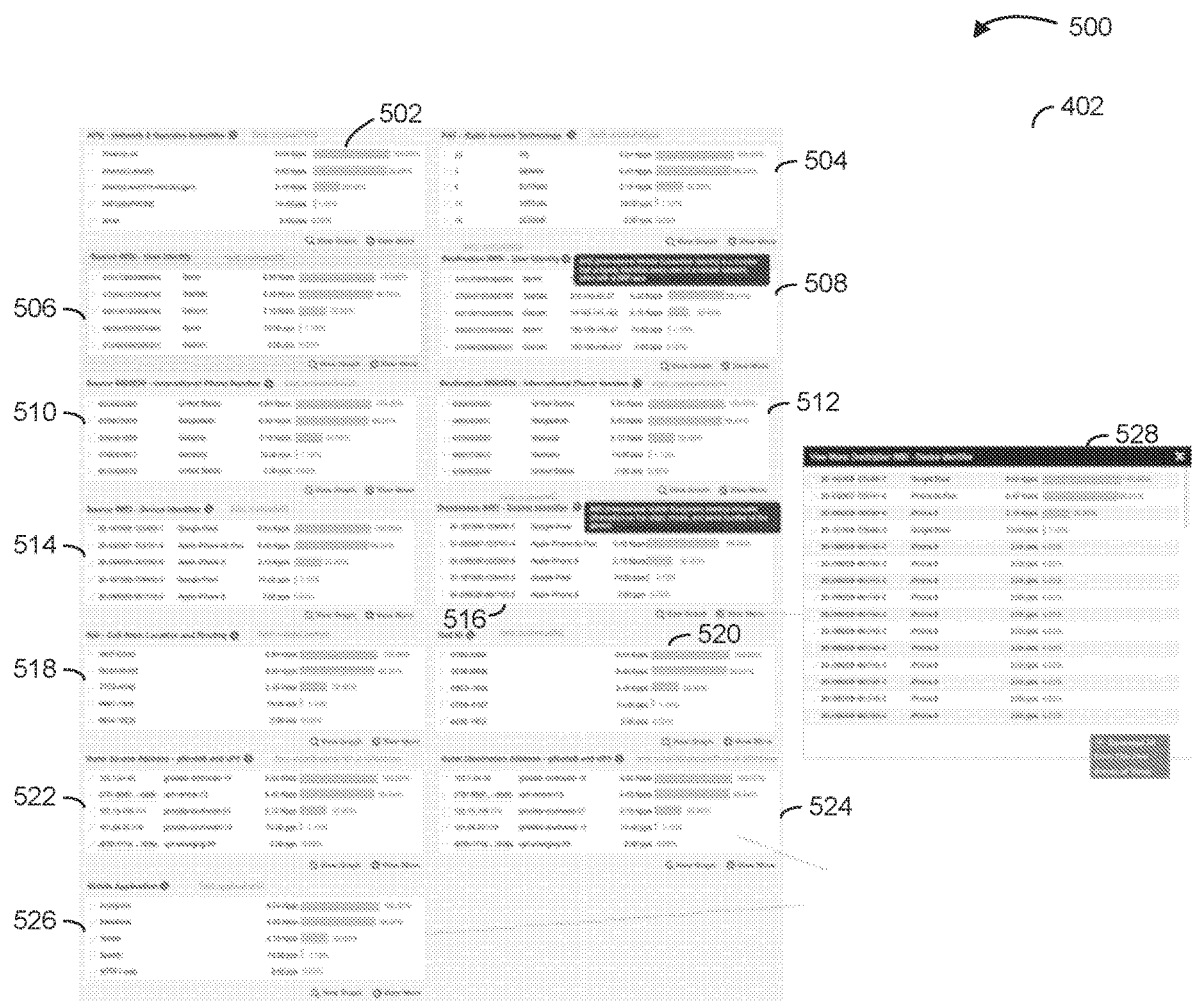
Figure 6:
Figure 7:
Figure 8:
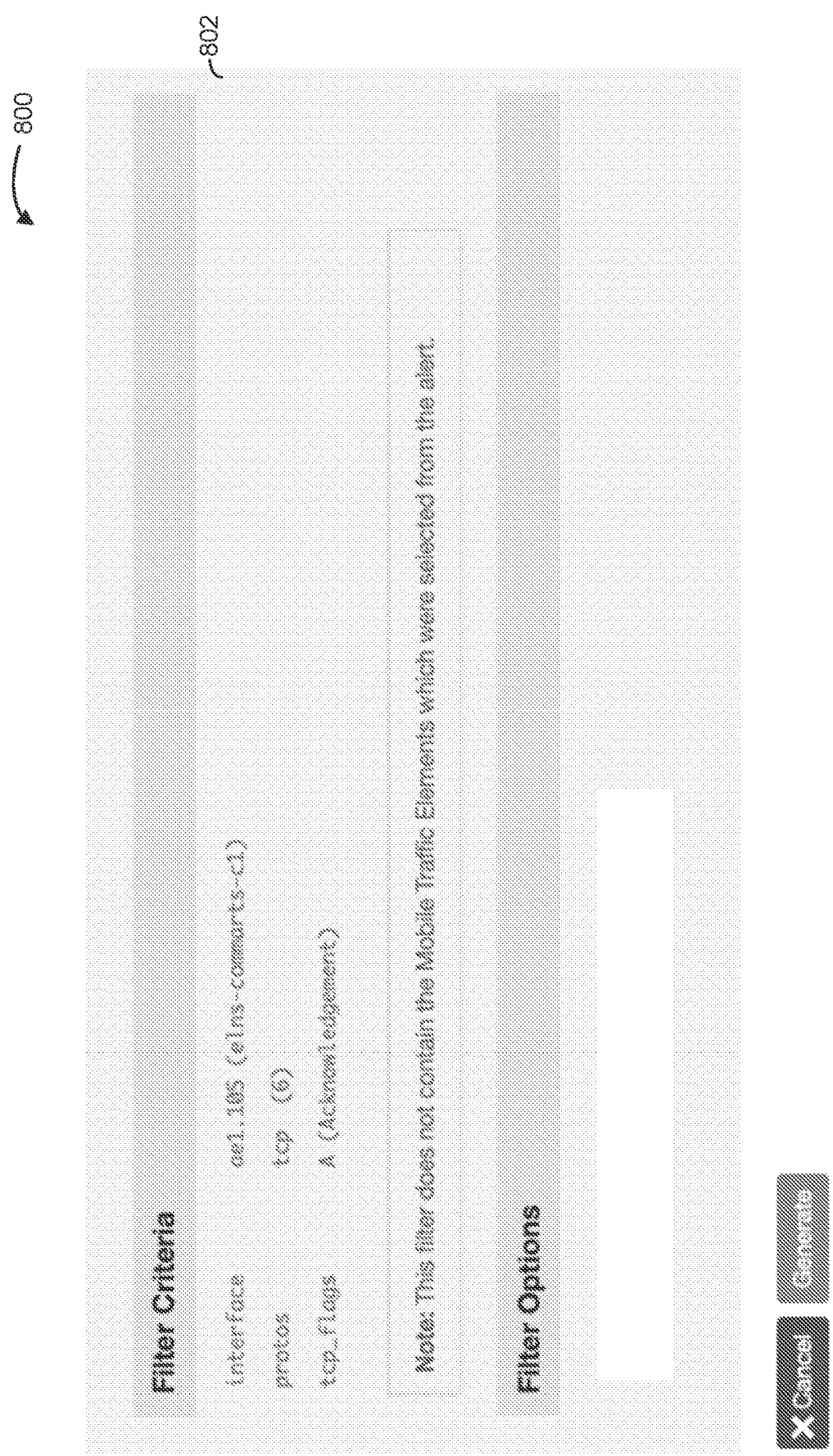
Figure 9:
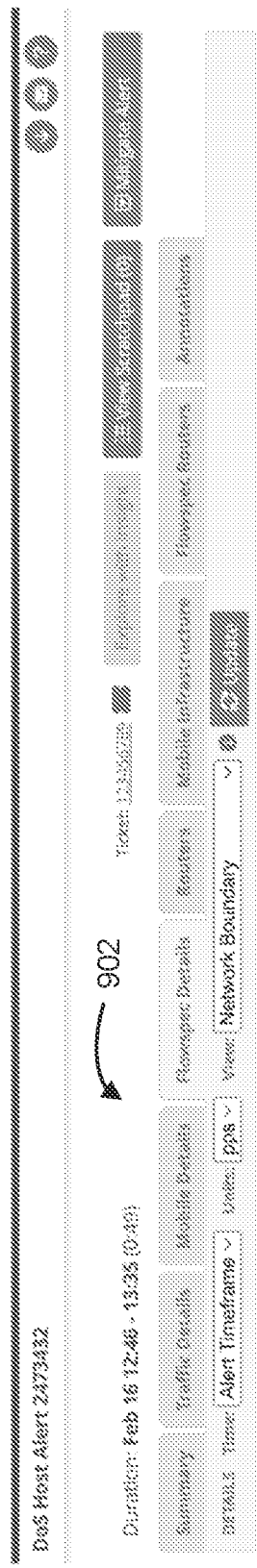
Figure 10:
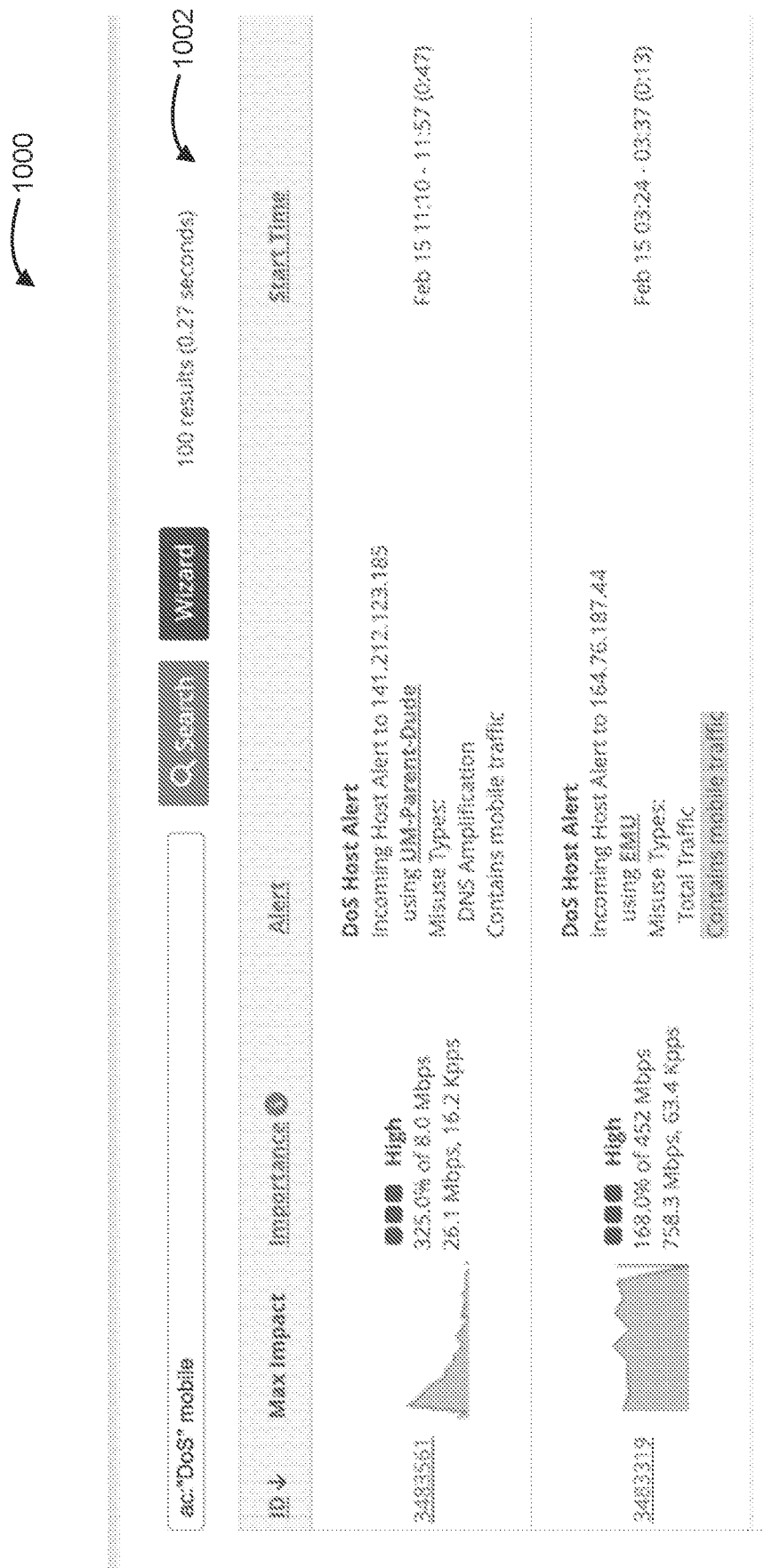
Figure 11:
Figure 13:
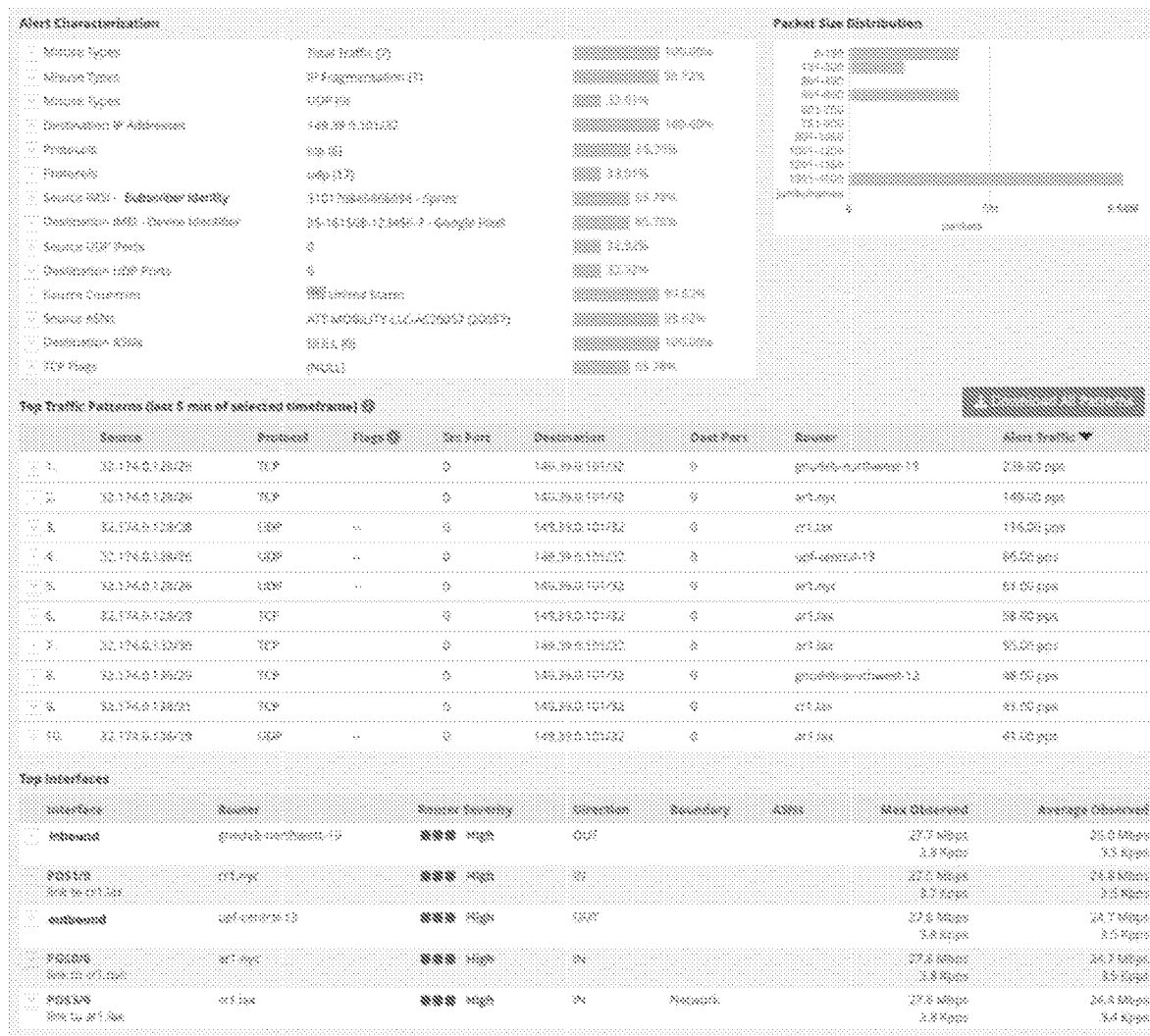

FIG. 3 is an illustration of a method 300 for DDoS source detection, in accordance with an implementation. The method 300 can be performed by a data processing system (a client device, a probe, the DDoS attack analyzer 110, shown and described with reference to FIG. 1, a server system, etc.). The method 300 may include more or fewer operations and the operations may be performed in any order. Performance of the method 300 may enable the data processing system to analyze data packets transmitted between nodes to detect sources of DDoS attacks at host computing devices in a mobile networking environment or the network itself. A probe can collect and correlate user plane data and control plane data of communication sessions. The probe can transmit the correlated data to the data processing system. The data processing system can determine a DDoS attack occurred at a computing device. The data processing system can calculate or determine an amount of traffic for communication sessions between one or more computing devices and the attacked computing device or network based on the correlated data. The data processing system can determine and/or identify computing devices that are the source of the DDoS attack based on the determined amounts of traffic. The data processing system can present the identified computing devices as a list on a user interface at a remote computing device to alert a user at the remote computing device of the source of the DDoS attack.

At operation 302, a probe collects control plane signaling data (e.g., data packets) and user plane data (e.g., data packets). Control plane signaling data and user plane data may include data packets that are transmitted across a network between client devices and various servers, such as service providers. The data packets may each include one or more device identifiers (e.g., an IMSI, an IMEI, a MAC address, an IP address, etc.), a timestamp indicating the time with which the data is associated or generated or the packet is transmitted, a tunnel identifier, a source port, a destination port, etc. The data may be data transmitted in communication sessions between the client devices and the servers and/or other client devices.

The probe can be configured to receive or collect user plane and control plane signaling data. For example, the probe can collect control plane signaling data from a network equipment manufacturer (NEM) trace port. In some embodiments, the control signaling probe may collect control plane signaling data at an Evolved Packet Core interface (e.g., the S1-MME interface or the S6a interface) of the network. The probe may collect user plane data. For example, the probe may comprise one or more processors that are connected to a core interface (e.g., an S1-U logical interface) of the network to collect user plane data.

At operation 304, the probe correlates the control plane signaling data and the user plane data. The probe can correlate the control plane signaling data and the user plane data based on tunnel identifiers in the data packets of the respective data. For example, tunnel identifiers can correspond to individual communication sessions between client devices and servers of service providers. Control plane data packets and user plane data packets for the same communication session may include the same tunnel identifiers. The probe can identify different tunnel identifiers from the control plane data packets and the user plane data packets and generate data structures or records for each unique tunnel identifier or communication session. The probe can store data packets or data from data packets in the data structures or records that contain the same tunnel identifiers as the tunnel identifiers in the data packets. The probe can transmit the correlated data to a data processing system.

At operation 306, the data processing system determines whether an anomaly has been detected. The data processing system can determine whether an anomaly has been detected using the correlated data the data processing system receives from the probe. For example, the data processing system can determine whether an anomaly has been detected based on data in data packets transmitted or exchanged between host computing devices and client devices or based on whether the data processing system has received an indication of an attack (e.g., a DDoS attack or DoS attack). For example, the data processing system can analyze and/or maintain and increment a counter indicating the number of data packets or the number of bits that individual computing devices are transmitting (e.g., transmitting to other computing devices or otherwise across the network) over time. The data processing system can determine rates of packet or data transmission. The data processing system can compare the number of data packets, the rate of data packet transmission, the number of bits, and/or the rate of bit transmission to one or more criteria. Responsive to determining the comparison satisfies a criterion indicating an anomaly (e.g., a DDoS attack), the data processing system may determine there is an anomaly or a DDoS attack. Otherwise, the data processing system may determine there is not an anomaly or DDoS attack. In some embodiments, the data processing system may determine whether there is an anomaly or DDoS attack based on whether the data processing system receives a message indicating an anomaly or attack at a host computing device or a component of a network infrastructure. The probe and the data processing system can repeat operations 302-306 until determining an anomaly or DDoS attack.

Responsive to determining an anomaly or a DDoS attack, at operation 308, the data processing system calculates an amount of traffic. The data processing system can calculate an amount of traffic for individual computing devices. The data processing system can calculate an amount of traffic for individual computing devices that are in communication with the computing device experiencing the DDoS attack. For example, the data processing system can identify the records or data structures containing data and/or data packets of communication sessions between the host computing device experiencing the DDoS attack and client devices. The data processing system can calculate the traffic (e.g., network traffic) that is associated with such client devices by maintaining and incrementing a counter of the number of data packets, data packet transmission rate, bits, or bit transmission rate for each computing device in communication with the host computing device experiencing the DDoS attack. The calculated values can be amounts of traffic associated with the individual computing devices in communication with the host computing device experiencing the DDoS attack.

At operation 310, the data processing system determines whether amounts of traffic for the individual computing device satisfy a device anomaly criterion. Device anomaly criteria can include one or more thresholds (e.g., a defined static threshold or dynamic thresholds determined by the data processing system based on historical data traffic data of individual host computing devices) and/or rules for determining whether computing devices are the source or sources of a DDoS attack. In one example, the data processing system can compare the amounts of traffic with each other to rank the amounts of traffic and/or computing devices associated with the amounts of traffic. The data processing system can identify a defined number of the highest ranked computing devices or amounts of traffic as satisfying a device anomaly criterion. In some cases, the data processing system may only identify devices as sources of DDoS attacks responsive to the amounts of traffic associated with the computing devices exceeding a threshold.

At operation 312, the data processing system adds identifiers (e.g., IMSIs, IMEIs, MAC addresses, etc.) of any computing devices identified as satisfying a device anomaly criterion to a list. The list may be or include computing devices that the data processing system identified as being a source of the DDoS attack. The data processing system may not add device identifiers of computing devices associated with amounts of network traffic that do not satisfy any device criteria to the list.

At operation 314, the data processing system determines whether amounts of traffic for the individual types of computing devices satisfy a device type anomaly criterion. Device type anomaly criteria can include one or more thresholds (e.g., a defined static threshold or dynamic thresholds determined by the data processing system based on historical data traffic data of individual host computing devices) and/or rules for determining whether type of computing devices are the source or sources of a DDoS attack. In one example, the data processing system can determine aggregate amounts of traffic as sums of amounts of traffic for computing devices of the same type. The data processing system can compare the aggregate amounts of traffic with each other to rank the aggregate amounts of traffic and/or types of computing devices associated with the aggregate amounts of traffic. The data processing system can identify a defined number of the highest ranked types of computing devices or aggregate amounts of traffic as satisfying a device type anomaly criterion. In some cases, the data processing system may only identify types of computing devices as sources of DDoS attacks responsive to the aggregate amounts of traffic associated with the types of computing devices exceeding a threshold.

At operation 316, the data processing system adds identifications of the types of computing devices identified as satisfying a device type anomaly criterion to a list. The list may be or include types of computing devices that the data processing system identified as being a source of the DDoS attack. The data processing system may not add identifications of types of computing devices associated with aggregate amounts of network traffic that do not satisfy any device criteria to the list.

At operation 318, the data processing system generates a record. In some embodiments, the record can be or include a user interface. The data processing system can generate the user interface to include the list of computing devices and/or the list of types of computing devices. Accordingly, when the user interface is displayed at a computing device, the two lists can be displayed concurrently. The data processing system can include other types of data regarding the computing devices and/or types of computing devices on the user interface. For example, the data processing system can include the IMSIs, MSISDNs, the network providers, the countries, the IMEIs, the types of the computing devices, and/or the amounts of traffic for each computing device on the user interface. The data processing system can include the TACs of the types of computing devices on the user interface. The data processing system can include any type of data on the user interface. In some embodiments, the record can be or include a data packet or message. The data processing system can include the same data in the data packet or message as described above with respect to the user interface.

At operation 320, the data processing system transmits the record. In embodiments in which the record is a user interface, the data processing system can transmit the record to a remote computing device. The remote computing device can receive the user interface and present the user interface on a display. In embodiments in which the record is a message or data packet, the data processing system can transmit the message or data packets to a computing device in control of the communications network through which the DDoS attack is occurring. The computing device can receive the data packet and adjust or reorganize the communications network based on the data in the data packet. In this way, the data processing system may alert and/or mitigate DDoS attacks in a mobile network environment.

FIGS. 4-13 are example user interfaces 400-1300 illustrating data regarding DDoS attacks, in accordance with an implementation. The user interfaces 400-1300 can be user interfaces generated by a data processing system (e.g., the user interface generator 136 or the DDoS attack analyzer 110, shown and described with reference to FIG. 1). Through the user interfaces 400-1300, the data processing system can provide a platform that a user can use to view different details regarding a DDoS attack.

In the user interface 400, a page 402 can be shown that illustrates data usage regarding a DDoS attack at a host computing device (e.g., the attacked service provider 108) or network (e.g., the attacked network 105). The page 402 can be displayed after or responsive to selection of a tab 404 that corresponds to depicting traffic details for a DDoS attack. A user can view the page 402 to determine characteristics of the DDoS attacks to determine mitigation measures for resolving the DDoS attack or preventing future DDoS attacks.

The page 402 can include a traffic graph 406, a list of computing devices 408, a list of source device models 410, a list of destination device models 412, a list of source network providers 414, and a list of destination network providers 416. The traffic graph 406 can illustrate the amount of traffic for different IMSIs over time. The IMSIs may be IMSIs of computing devices determined to be the source or sources of the DDoS attack. The list of computing devices 408 can include a list of computing devices determined to be the source or sources of the DDoS attack. The traffic graph 406 can illustrate the traffic associated with a defined number of computing devices of the list of computing devices (e.g., a defined number of computing devices associated with the highest amount of traffic). The list of computing device 408 can illustrate data regarding each computing device of the list, such as IMSIs, MSISDNs, network providers, countries, IMEIs, device types, and/or amounts of traffic.

The list of source device models 410 can be or include a number of source device models (e.g., device types) that correspond with the highest amount of traffic for the DDoS attack. Each source device model of the list of source device models 410 can include a TAC, an amount of traffic (e.g., an aggregate amount of traffic), and/or a percentage of traffic that the source device model is responsible for the DDoS attack. The list of destination device models 412 can be or include a number of destination device models (e.g., device types) that correspond with the highest amount of traffic for the DDoS attack. Each destination device model of the list of destination device models 412 can include a TAC, an amount of traffic (e.g., an aggregate amount of traffic), and/or a percentage of traffic that the destination device model is responsible for the DDoS attack.

The list of source network providers 414 can be or include a number of source network providers that correspond with the highest amount of traffic for the DDoS attack. Each network provider of the list of source network providers 414 can include an MNC or MCC code, an amount of traffic (e.g., an aggregate amount of traffic), and/or a percentage of traffic that the source network provider is responsible for the DDoS attack. The list of destination network providers 416 can be or include a number of destination network providers that correspond with the highest amount of traffic for the DDoS attack. Each destination network provider of the list of destination network providers 416 can include an MNC or MCC code, an amount of traffic (e.g., an aggregate amount of traffic), and/or a percentage of traffic that the destination network provider is responsible for the DDoS attack.

The user interface 500 can include another view of the page 402. A user can view the user interface 500 using a sliding bar or otherwise moving the page 402 upward onto the display of the computing device the user is using to view the page 402. The user interface 500 can include a list of access point names (APNs) 502, a list of radio access technologies 504, a list of source IMSIs 506, a list of destination IMSIs 508, a list of source MSISDNs 510, a list of destination MSISDNs 512, a list of source IMEIs 514, a list of destination IMEIs 516, a list of cells areas 518, a list of cell identifications 520, a list of outer source addresses 522, a list of outer destination addresses 524, and a list of mobile applications 526. Lists as described herein can be depicted as widgets that are visually separate from each other on a user interface. Each of the lists 502-524 can include a list of components that communicated with or are communicating with the attacked host computing device or network during the DDoS attack (e.g., communicated with the attacked host computing device or network within a defined time period). The data processing system can generate each of the lists 502-524 using similar techniques to those described above by identifying the identifiers for the corresponding components for each list from the records or data structures for communication sessions computing devices have with the attacked host computing device or network, aggregating the amount of traffic associated with the respective identifiers, and then comparing the aggregated amounts of traffic to criteria. The data processing system can generate each of the lists 502-524 to include the components of the list that are associated with the highest amount of traffic with the attacked host computing device or network. The data processing system can generate each list to illustrate the values that the data processing system used to identify the components, the amounts of traffic or aggregate amounts of traffic for each component, and/or a percentage of the amount of traffic with the attacked host computing device or network for which the components are responsible. The data processing system can present any combination or permutation of the lists 502-524 and/or 408-416 concurrently on a user interface or page at a remote computing device accessed by a user. Thus, the data processing system can improve the amount of accessible data to an operator seeking to improve or mitigate attacks over a communications network.

The data processing system may only cause the tab 404 to be displayed at a user interface responsive to determining defined conditions are met for an attack. The conditions can be, for example, the user accessing the platform provided by the data processing system has an appropriate access level or authorization to view such information, the data processing system is communicating with a probe (e.g., network monitoring equipment) monitoring a communications network facilitating communication between mobile computing devices (e.g., a network facilitating communications over 4G or 5G), and/or the attack involves or is associated with mobile traffic data (e.g., involves data collected by the probe). The data processing system may determine whether each of such conditions are true responsive to determining an attack, such as by analyzing the data of the attack, by analyzing account settings or accessibility levels of the user accessing the user interface, and/or identifying the connections of the data processing system. Responsive to determining each condition is met, the data processing system may display the tab 404 on a user interface depicting data for the attack. Otherwise, the data processing system may not display the tab 404.

The page 402 may display network traffic data for mobile communications network. For example, the page 402 may display network traffic data related to different tuples (e.g., components, as described above), such as IMSI, MSISDN, provider/carrier, country, IMEI, device type, and/or an amount of traffic observed for the tuple.

The data processing system can use a series of tables to determine a defined number (e.g., five) of entries for each of the tuples and the entries' associated amount of traffic observed for the attack. The data processing system can determine the defined number of entries as entries with the highest amounts of traffic. The data processing system can display the determined defined number of entries for each tuple on the page 402 in the lists depicted on the page 402. A user can select an option (e.g., a "view more" option) on the page 402 to view a defined number of further entries (e.g., a defined number of entries associated with the next highest amounts of traffic) or the remaining entries for the tuple. The page 402 may enable the user to view more entries for any tuple. A user can also select an option to download or export entries or lists of any or all types of tuples for the attack.

The page 402 may include, for example, entries for the following tuples:
 1. Source & Destination TAC—the device model
 2. Source & Destination MNC/MCC—the Mobile Network Operator
 3. APN—Network & Operator Identifier
 4. RAT—Radio Access Technology
 5. Source & Destination IMSI—the User Identifier
 6. Source & Destination MSISDN—the Phone Number that another person can call
 7. Source & Destination IMEI—the Device Identifier
 8. RAI—Cell Area—Location and Routing
 9. Cell ID
 10. Outer Source & Destination Address—gNodeB and UPFs
 11. Mobile Application Entries for each tuple can include amounts of traffic and/or percentages of the amount of traffic for which the entries are responsible for the DDoS attack.

The user interface 600 illustrates a page 602. The page 602 can be an example page for displaying traffic data for a DDoS attack at a host computing device similar to the page 402.

In the user interface 700, a page 702 can be shown that illustrates a summary of traffic regarding a DDoS attack at a host computing device (e.g., the attacked service provider 108) or network (e.g., the attacked network 105). The page 702 can be displayed after or responsive to selection of a tab 704 that corresponds to depicting a summary of traffic details for a DDoS attack. A user can view the page 702 to determine characteristics of the DDoS attacks to determine mitigation measures for resolving the DDoS attack or preventing future DDoS attacks. The page 702 can include information about the DDoS attack 706, a graph 708 illustrating the types of misuse of the DDoS attack, a list 710 illustrating the characteristics of the attack, a packet size distribution 712 for the attack, a list 714 of top traffic patterns, and/or a list 716 of interfaces used in the DDoS attack.

The user interface 800 illustrates an example page 802 for filtering traffic for a DDoS attack. Via the page 802, a user can select different options regarding the types of data (e.g., lists of components or tuples) the user wishes to see for a DDoS attack. The user interface 900 illustrates an example set of tabs 902 that a user can use to navigate the platform providing details regarding a DDoS attack.

The user interface 1000 illustrates an example list 1002 of anomalies (e.g., DoS or DDoS attacks). The example list 1002 can include information regarding the start time of the attack, the importance of the attack (e.g., the impact or amount of traffic that was involved in the attack), how the attack was performed (e.g., domain name server (DNS) amplification, total traffic, etc.), and/or whether the attack involved or included mobile traffic. A user can select identifications of the different attacks of the list 1002 to view data regarding the attack. In one example, responsive to selecting an identification and/or responsive to the data processing system determining the conditions are met, the user can view the page 402 or the data depicted on the user interfaces 400 and/or 500.

The user interface 1100 illustrates data regarding the mobile infrastructure involved in the DDoS attack (e.g., network nodes, base stations, or cells that transmitted or distributed data for the attack). The user interface 1100 can include a page 1102. A user can access the page 1102 by selecting a tab 1104 corresponding to the page 1102. The page 1102 can include a graph 1106 and a table 1108. The graph 1106 can illustrate the amounts of traffic that were transmitted through different network nodes in the DDoS attack. The table 1108 can illustrate the inbound and outbound traffic at the network nodes during or for the attack. The table 1108 can include data such as the average packet size, the maximum amounts of traffic in amounts of data transmitted and/or number of packets transmitted, and/or the average amount of traffic in amounts of data transmitted and/or number of packets transmitted.

The user interface 1200 can illustrate one or more lists of elements (e.g., traffic patterns, protocols, IMSIs, IMEIs, MSISDNs, source addresses, etc.) that were determined to be the source of a DDoS attack. The user interface 1200 can be or include an alert that can be transmitted to a remote computing device to indicate the attack. The user interface 1300 further data regarding the traffic that is transmitted or exchanged in a DDoS attack.

The page 402 can include a traffic graph 406, a list of computing devices 408, a list of source device models 410, a list of destination device models 412, a list of source network providers 414, and a list of destination network providers 416.

At least one aspect of a technical solution to the aforementioned problem is directed to a method. The method may include collecting, by one or more processors, control plane signaling data and user plane data using network monitoring equipment connected to a communications network, the control plane signaling data and the user plane data transmitted by a plurality of computing devices in communication sessions; correlating, by the one or more processors, the control plane signaling data and the user plane data based on matching identifiers between the control plane signaling data and the user plane data; calculating, by the one or more processors, for each of the plurality of computing devices, an amount of traffic associated with the computing device for a defined time period based on the correlated user plane data and control plane signaling data; determining, by the one or more processors, one or more computing devices that are associated with an amount of traffic satisfying a device anomaly criterion; and generating, by the one or more processors, a record comprising a list of the one or more computing devices.

At least one aspect of a technical solution to the aforementioned problem is directed to a system. The system may include one or more processors, coupled to memory, to collect control plane signaling data and user plane data using network monitoring equipment connected to a communications network, the control plane signaling data and the user plane data transmitted by a plurality of computing devices in communication sessions; correlate the control plane signaling data and the user plane data based on matching identifiers between the control plane signaling data and the user plane data; calculate for each of the plurality of computing devices, an amount of traffic associated with the computing device for a defined time period based on the correlated user plane data and control plane signaling data; determine one or more computing devices that are associated with an amount of traffic satisfying a device anomaly criterion; and generate a record comprising a list of the one or more computing devices.

At least one aspect of a technical solution to the aforementioned problem is directed to a non-transitory computer readable storage medium. The medium may include instructions stored thereon that, when executed by one or more processors, cause the one or more processors to collect control plane signaling data and user plane data using network monitoring equipment connected to a communications network, the control plane signaling data and the user plane data transmitted by a plurality of computing devices in communication sessions; correlate the control plane signaling data and the user plane data based on matching identifiers between the control plane signaling data and the user plane data; calculate for each of the plurality of computing devices, an amount of traffic associated with the computing device for a defined time period based on the correlated user plane data and control plane signaling data; determine one or more computing devices that are associated with an amount of traffic satisfying a device anomaly criterion; and generate a record comprising a list of the one or more computing devices.

Figure 14A:
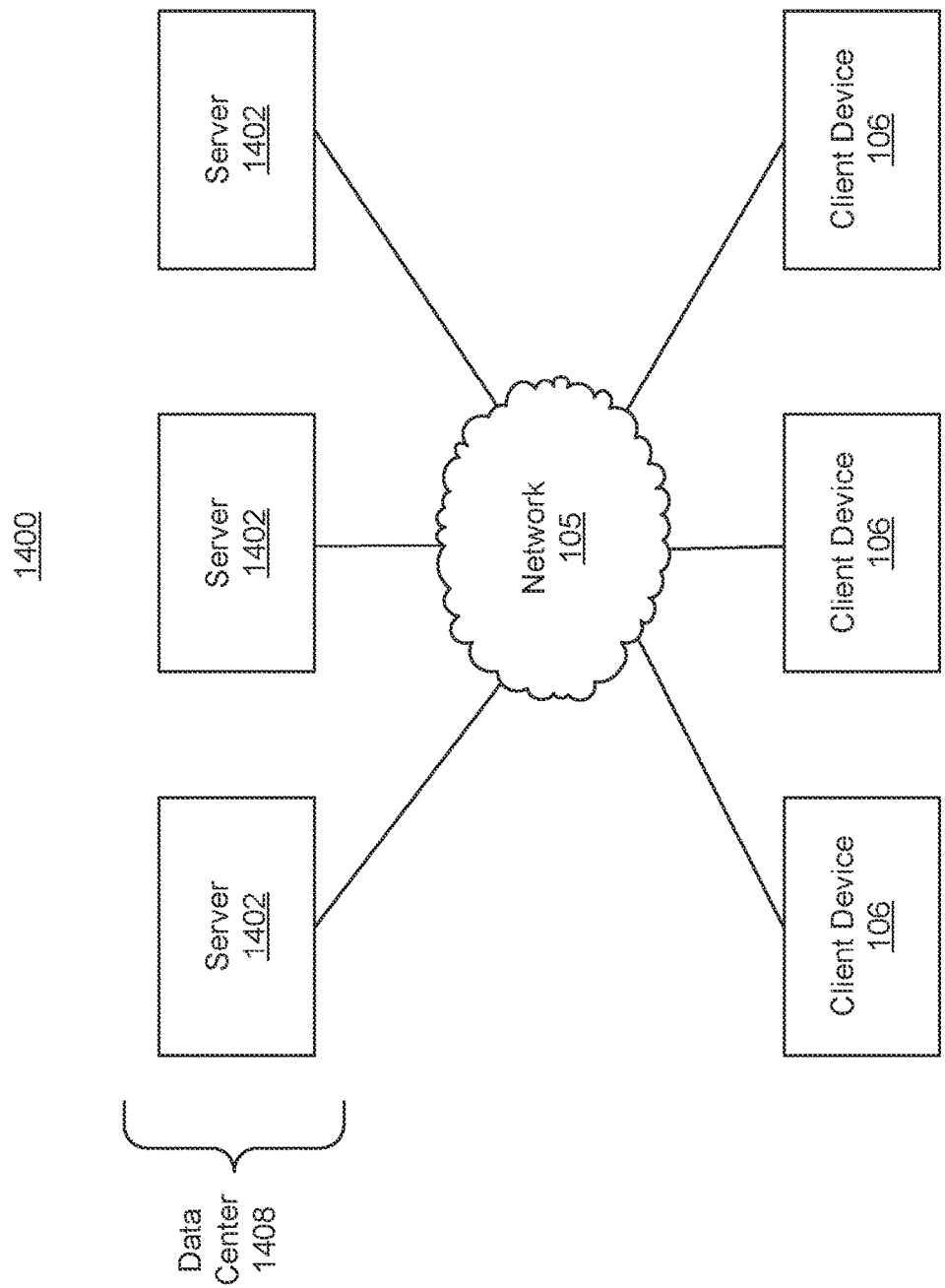
FIG. 14A is a block diagram depicting an implementation of a network environment including a client device in communication with a server device.

FIG. 14A depicts an example network environment that can be used in connection with the methods and systems described herein. In brief overview, the network environment 1400 includes one or more client devices 106 (also generally referred to as clients, client node, client machines, client computers, client computing devices, endpoints, or endpoint nodes) in communication with one or more servers 1402 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 14A shows a network 105 between the client devices 106 and the servers 1402, the client devices 106 and the servers 1402 can be on the same network 105. In embodiments, there are multiple networks 105 between the client devices 106 and the servers 1402. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPV6), or the link layer. The network 105 can be a type of a broadcast network, a telecommunications network, a data communication network, or a computer network.

The network environment 1400 can include multiple, logically grouped servers 1402. The logical group of servers can be referred to as a data center 1408 (or server farm or machine farm). In embodiments, the servers 1402 can be geographically dispersed. The data center 1408 can be administered as a single entity or different entities. The data center 1408 can include multiple data centers 1408 that can be geographically dispersed. The servers 1402 within each data center 1408 can be homogeneous or heterogeneous (e.g., one or more of the servers 1402 or machines 1402 can operate according to one type of operating system platform (e.g., WINDOWS NT, manufactured by Microsoft Corp. of Redmond, Washington), while one or more of the other servers 1402 can operate on according to another type of operating system platform (e.g., Unix, Linux, or Mac OS X)). The servers 1402 of each data center 1408 do not need to be physically proximate to another server 1402 in the same machine farm 1408. Thus, the group of servers 1402 logically grouped as a data center 1408 can be interconnected using a network. Management of the data center 1408 can be de-centralized. For example, one or more servers 1402 can comprise components, subsystems and modules to support one or more management services for the data center 1408.

Server 1402 can be a file server, application server, web server, proxy server, appliance, network appliance, gateway, gateway server, virtualization server, deployment server, SSL VPN server, or firewall. In embodiments, the server 1402 can be referred to as a remote machine or a node. Multiple nodes can be in the path between any two communicating servers.

Figure 14B:
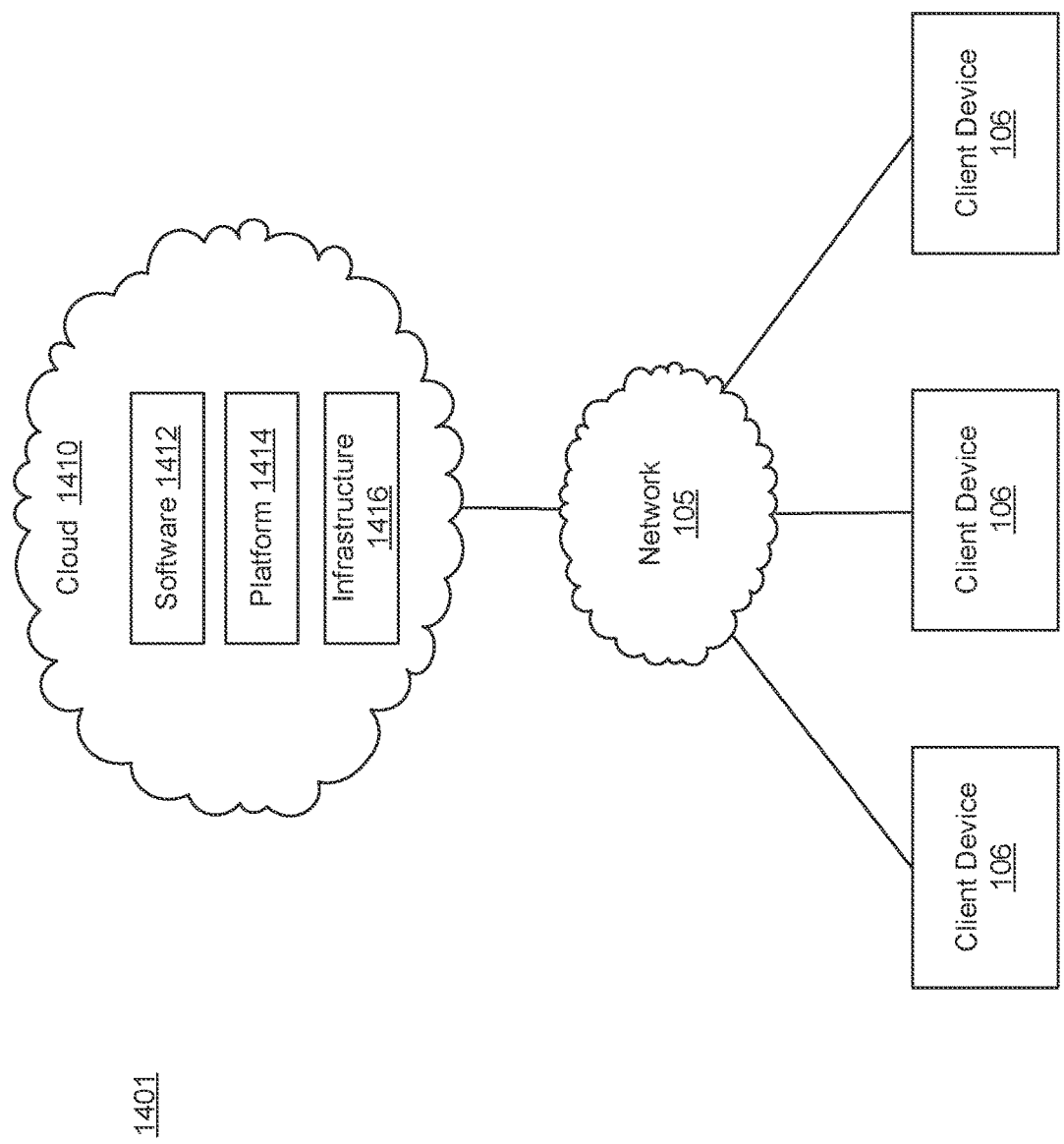
FIG. 14B is a block diagram depicting a cloud computing environment including a client device in communication with cloud service providers.

FIG. 14B illustrates an example cloud computing environment. A cloud computing environment 1401 can provide client 106 with one or more resources provided by a network environment. The cloud computing environment 1401 can include one or more client devices 106, in communication with the cloud 1410 over one or more networks 105. Client devices 106 can include, e.g., thick clients, thin clients, and zero clients. A thick client can provide at least some functionality even when disconnected from the cloud 1410 or servers 1402. A thin client or a zero client can depend on the connection to the cloud 1410 or server 1402 to provide functionality. A zero client can depend on the cloud 1410 or other networks 105 or servers 1402 to retrieve operating system data for the client device. The cloud 1410 can include back end platforms, e.g., servers 1402, storage, server farms or data centers.

The cloud 1410 can be public, private, or hybrid. Public clouds can include public servers 1402 that are maintained by third parties to the client devices 106 or the owners of the clients. The servers 1402 can be located off-site in remote geographical locations as disclosed above or otherwise. Public clouds can be connected to the servers 1402 over a public network. Private clouds can include private servers 1402 that are physically maintained by client devices 106 or owners of clients. Private clouds can be connected to the servers 1402 over a private network 105. Hybrid clouds 1408 can include both the private and public networks 105 and servers 1402.

The cloud 1410 can also include a cloud-based delivery, e.g., Software as a Service (SaaS) 1412, Platform as a Service (PaaS) 1414, and the Infrastructure as a Service (IaaS) 1416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 1402 can be deployed as and/or executed on any type and form of computing device, e.g., a computer, network device or appliance capable of communicating on any type and form of network and performing the operations described herein.

Figure 14C:
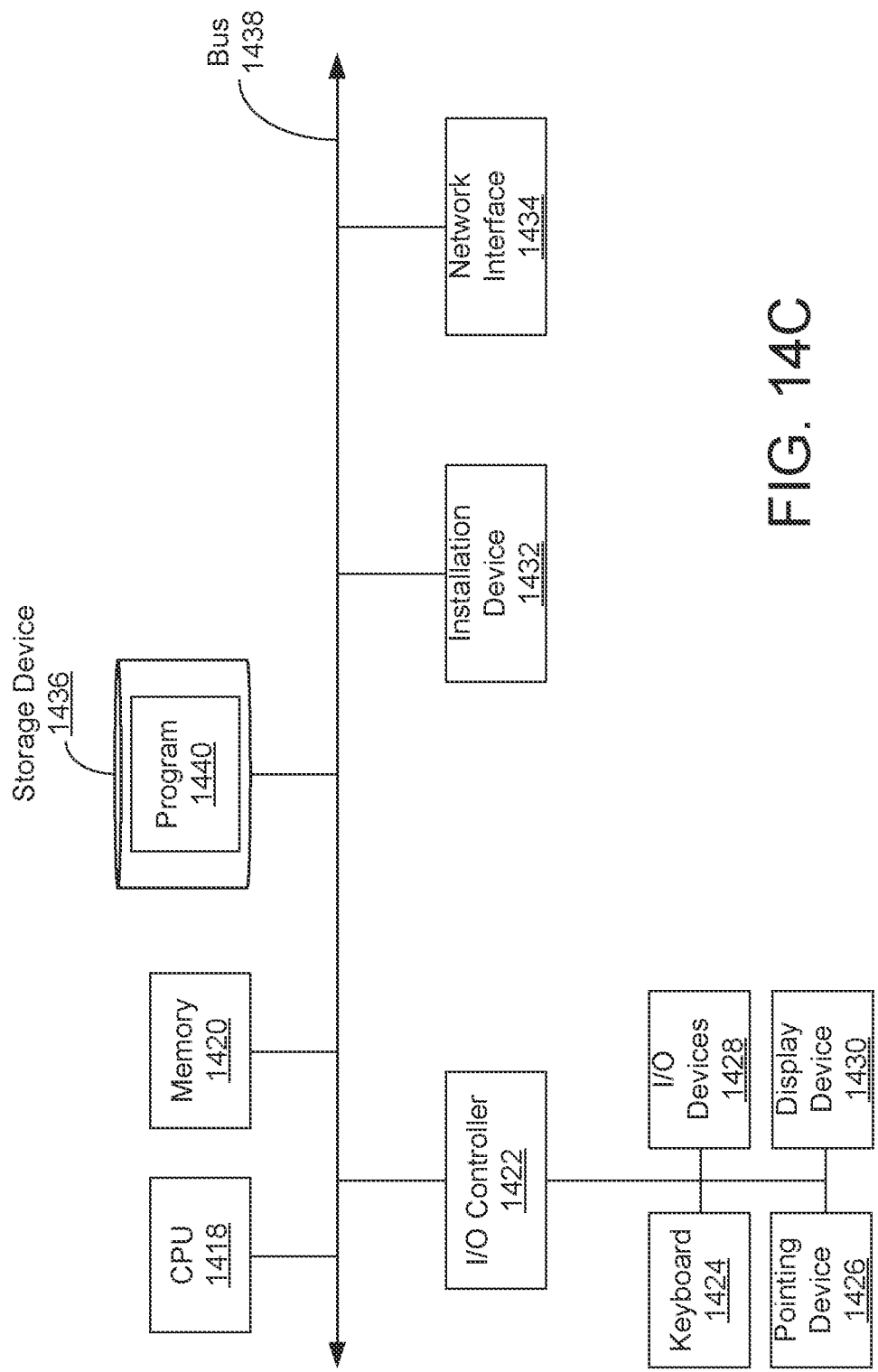
FIG. 14C is a block diagram depicting an implementation of a computing device that can be used in connection with the systems depicted in FIGS. 1, 14A, and 14B and the method depicted in FIG. 3.

FIG. 14C depicts block diagrams of a computing device 1403 useful for practicing an embodiment of the client 106 or a server 1402. As shown in FIG. 14C, each computing device 1403 can include a central processing unit 1418, and a main memory unit 1420. As shown in FIG. 14C, a computing device 1403 can include one or more of a storage device 1436, an installation device 1432, a network interface 1434, an I/O controller 1422, a display device 1430, a keyboard 1424 or a pointing device 1426, e.g., a mouse. The storage device 1436 can include, without limitation, a program 1440, such as an operating system, software, or software associated with system 100.

The central processing unit 1418 is any logic circuitry that responds to and processes instructions fetched from the main memory unit 1420. The central processing unit 1418 can be provided by a microprocessor unit, e.g.: those manufactured by Intel Corporation of Mountain View, California. The computing device 1403 can be based on any of these processors, or any other processor capable of operating as described herein. The central processing unit 1418 can utilize instruction level parallelism, thread level parallelism, different levels of cache, and multi-core processors. A multi-core processor can include two or more processing units on a single computing component.

Main memory unit 1420 can include one or more memory chips capable of storing data and allowing any storage location to be directly accessed by the microprocessor 1418. Main memory unit 1420 can be volatile and faster than storage 1436 memory. Main memory units 1420 can be Dynamic random access memory (DRAM) or any variants, including static random access memory (SRAM). The memory 1420 or the storage 1436 can be non-volatile; e.g., non-volatile read access memory (NVRAM). The memory 1420 can be based on any type of memory chip, or any other available memory chips. In the example depicted in FIG. 14C, the processor 1418 can communicate with memory 1420 via a system bus 1438.

A wide variety of I/O devices 1428 can be present in the computing device 1403. Input devices 1428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 1428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 1428, display devices 1430 or group of devices can be augmented reality devices. The I/O devices can be controlled by an I/O controller 1422 as shown in FIG. 14C. The I/O controller 1422 can control one or more I/O devices, such as, e.g., a keyboard 1424 and a pointing device 1426, e.g., a mouse or optical pen. Furthermore, an I/O device can also provide storage and/or an installation device 1432 for the computing device 1403. In embodiments, the computing device 1403 can provide USB connections (not shown) to receive handheld USB storage devices. In embodiments, an I/O device 1428 can be a bridge between the system bus 1438 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 1430 can be connected to I/O controller 1422. Display devices can include, e.g., liquid crystal displays (LCD), electronic papers (e-ink) displays, flexile displays, light emitting diode displays (LED), or other types of displays. In some embodiments, display devices 1430 or the corresponding I/O controllers 1422 can be controlled through or have hardware support for OPENGL or DIRECTX API or other graphics libraries. Any of the I/O devices 1428 and/or the I/O controller 1422 can include any type and/or form of suitable hardware, software, or combination of hardware and software to support, enable or provide for the connection and use of one or more display devices 1430 by the computing device 1403. For example, the computing device 1403 can include any type and/or form of video adapter, video card, driver, and/or library to interface, communicate, connect or otherwise use the display devices 1430. In embodiments, a video adapter can include multiple connectors to interface to multiple display devices 1430.

The computing device 1403 can include a storage device 1436 (e.g., one or more hard disk drives or redundant arrays of independent disks) for storing an operating system or other related software, and for storing application software programs 1440 such as any program related to the systems, methods, components, modules, elements, or functions depicted in FIG. 1, 2, or 3. Examples of storage device 1436 include, e.g., hard disk drive (HDD); optical drive including CD drive, DVD drive, or BLU-RAY drive; solid-state drive (SSD); USB flash drive; or any other device suitable for storing data. Storage devices 1436 can include multiple volatile and non-volatile memories, including, e.g., solid state hybrid drives that combine hard disks with solid state cache. Storage devices 1436 can be non-volatile, mutable, or read-only. Storage devices 1436 can be internal and connect to the computing device 1403 via a bus 1438. Storage device 1436 can be external and connect to the computing device 1403 via an I/O device 1430 that provides an external bus. Storage device 1436 can connect to the computing device 1403 via the network interface 1434 over a network 105. Some client devices 106 may not require a non-volatile storage device 1436 and can be thin clients or zero client devices 106. Some storage devices 1436 can be used as an installation device 1432 and can be suitable for installing software and programs.

The computing device 1403 can include a network interface 1434 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 1403 can communicate with other computing devices 1403 via any type and/or form of gateway or tunneling protocol, e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 1434 can include a built-in network adapter, network interface card, PCMCIA network card, EXPRESSCARD network card, card bus network adapter, wireless network adapter, USB network adapter, modem or any other device suitable for interfacing the computing device 1403 to any type of network capable of communication and performing the operations described herein.

A computing device 1403 of the sort depicted in FIG. 14C can operate under the control of an operating system, which controls scheduling of tasks and access to system resources. The computing device 1403 can be running any operating system configured for any type of computing device, including, for example, a desktop operating system, a mobile device operating system, a tablet operating system, or a smartphone operating system.

The computing device 1403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 1403 has sufficient processor power and memory capacity to perform the operations described herein. In some embodiments, the computing device 1403 can have different processors, operating systems, and input devices consistent with the device.

In embodiments, the status of one or more machines 106, 1402 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 1403 in response to the CPU 1418 executing an arrangement of instructions contained in main memory 1420. Such instructions can be read into main memory 1420 from another computer-readable medium, such as the storage device 1436. Execution of the arrangement of instructions contained in main memory 1420 causes the computing device 1403 to perform the illustrative processes described herein. One or more processors in a multi-processing arrangement may also be employed to execute the instructions contained in main memory 1420. Hard-wired circuitry can be used in place of or in combination with software instructions together with the systems and methods described herein. Systems and methods described herein are not limited to any specific combination of hardware circuitry and software.

Although an example computing system has been described in FIG. 14, the subject matter including the operations described in this specification can be implemented in other types of digital electronic circuitry, or in computer software, firmware, or hardware, including the structures disclosed in this specification and their structural equivalents, or in combinations of one or more of them.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probe 104 or the DDoS attack analyzer 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
   collecting, by one or more processors, control plane signaling data and user plane data using network monitoring equipment connected to a communications network, the control plane signaling data and the user plane data transmitted by a plurality of computing devices in communication sessions, wherein the control plane signaling data includes session identifiers for the communication sessions and the user plane data includes corresponding session identifiers for the communication sessions;
   correlating, by the one or more processors, the control plane signaling data and the user plane data based on matching the session identifiers between the control plane signaling data and the user plane data to identify correlated data records for each communication session;
   calculating, by the one or more processors, for each of the plurality of computing devices, a total amount of network traffic transmitted and received by the computing device for a defined time period based on the correlated data records for all communication sessions involving the computing device during the defined time period;
   determining, by the one or more processors, one or more computing devices that are associated with a calculated total amount of network traffic that exceeds a device traffic threshold;
   generating, by the one or more processors, a record comprising a list of the one or more computing devices and their associated calculated total amounts of network traffic, wherein generating the record comprises generating, by the one or more processors, a user interface including the list of the one or more computing devices; and
   displaying, by the one or more processors, the user interface including the list of the one or more computing devices at a remote computing device.

2. The method of claim 1, wherein calculating the total amount of network traffic transmitted and received by the computing device comprises calculating, by the one or more processors, the total amount of network traffic responsive to determining an anomaly in the communications network or at one of the plurality of computing devices.

3. The method of claim 1, wherein calculating the total amount of network traffic transmitted and received by the computing device comprises calculating, by the one or more processors, the total amount of network traffic responsive to determining a distributed denial-of- service attack in the communications network or at one of the plurality of computing devices communicating over the communications network.

4. The method of claim 1, comprising:
   determining, by the one or more processors, types of computing devices of the plurality of computing devices that transmitted or received the correlated user plane data and control plane signaling data;
   identifying, by the one or more processors, one or more types of computing devices of the types of the plurality of computing devices that are associated with a total amount of network traffic that exceeds a device type traffic threshold; and
   generating, by the one or more processors, a second record comprising a list of the one or more types of computing devices.

5. The method of claim 4, comprising:
concurrently presenting, by the one or more processors, the list of the one or more types of computing devices and the list of the one or more computing devices on a user interface at a remote computer.

6. The method of claim 1, comprising:
determining, by the one or more processors, network carriers of computing devices that transmitted or received the correlated user plane data and control plane signaling data;
identifying, by the one or more processors, one or more network carriers of computing devices that are associated with an amount of traffic satisfying a device type anomaly criterion; and
generating, by the one or more processors, a second record comprising a list of the one or more network carriers of computing devices.

7. The method of claim 1, further comprising:
transmitting, by the one or more processors, the record including the list of the one or more computing devices to a communications network provider associated with the communications network,
wherein the communications network provider reorganizes the communications network according to the list of the one or more computing devices.

8. The method of claim 1, wherein correlating the control plane signaling data and the user plane data comprises identifying, by the one or more processors, matching tunnel identifiers of communication sessions between the control plane signaling data and the user plane data.

9. The method of claim 1, wherein determining the one or more computing devices that are associated with a total amount of network traffic that exceeds a device traffic threshold comprises:
ranking, by the one or more processors, the plurality of computing devices based on the total amount of network traffic associated with each of the plurality of computing devices; and
selecting, by the one or more processors, the one or more computing devices responsive to the one or more computing devices having a highest ranking or being associated with the highest total amount of network traffic.

10. The method of claim 1, wherein determining the one or more computing devices that have are associated with a total amount of network traffic that exceeds a device traffic threshold comprises:
comparing, by the one or more processors, the total amount of network traffic associated with each of the plurality of computing devices to a threshold; and
selecting, by the one or more processors, the one or more computing devices responsive to the one or more computing devices being associated with an amount of traffic exceeding the threshold.

11. The method of claim 10, further comprising:
determining, by the one or more processors, different thresholds for different host computing devices of the one or more computing devices based on historical traffic of the host computing devices.

12. A system, comprising:
one or more processors, coupled to memory, to:
collect control plane signaling data and user plane data using network monitoring equipment connected to a communications network, the control plane signaling data and the user plane data transmitted by a plurality of computing devices in communication sessions, wherein the control plane signaling data includes session identifiers for the communication sessions and the user plane data includes corresponding session identifiers for the communication sessions;
correlate the control plane signaling data and the user plane data based on matching the session identifiers between the control plane signaling data and the user plane data to identify correlated data records for each communication session;
calculate for each of the plurality of computing devices, a total amount of network traffic transmitted and received by the computing device for a defined time period based on the correlated data records for all communication sessions involving the computing device during the defined time period;
determine one or more computing devices that are associated with a calculated total amount of network traffic that exceeds a device traffic threshold; and
generate a record comprising a list of the one or more computing devices and their associated calculated total amounts of network traffic; and
present the list of the one or more types of computing devices and the list of the one or more computing devices on a user interface at a remote computer.

13. The system of claim 12, wherein the one or more processors calculate the total amount of network traffic transmitted and received by the computing device by calculating the total amount of network traffic responsive to determining an anomaly in the communications network or at one of the plurality of computing devices.

14. The system of claim 12, wherein the one or more processors calculate the total amount of network traffic transmitted and received by the computing device by calculating the total amount of network traffic responsive to determining a distributed denial-of-service attack in the communications network or at one of the plurality of computing devices communicating over the communications network.

15. The system of claim 12, wherein the one or more processors:
determine types of computing devices of the plurality of computing devices that transmitted or received the correlated user plane data and control plane signaling data;
identify one or more types of computing devices of the types of the plurality of computing devices that are associated with a total amount of network traffic that exceeds a device type traffic threshold; and
generate a second record comprising a list of the one or more types of computing devices.

16. A non-transitory computer readable storage medium comprising instructions stored thereon that, when executed by one or more processors, cause the one or more processors to:
collect control plane signaling data and user plane data using network monitoring equipment connected to a communications network, the control plane signaling data and the user plane data transmitted by a plurality of computing devices in communication sessions, wherein the control plane signaling data includes session identifiers for the communication sessions and the user plane data includes corresponding session identifiers for the communication sessions;
correlate the control plane signaling data and the user plane data based on matching the session identifiers between the control plane signaling data and the user plane data to identify correlated data records for each communication session;

calculate for each of the plurality of computing devices, a total amount of network traffic transmitted and received by the computing device for a defined time period based on the correlated data records for all communication sessions involving the computing device during the defined time period;

determine one or more computing devices that are associated with a calculated total amount of network traffic that exceeds a device traffic threshold;

generate a record comprising a list of the one or more computing devices and their associated calculated total amounts of network traffic; and present the list of the one or more types of computing devices and the list of the one or more computing devices on a user interface at a remote computer.

17. The medium of claim 16, comprising instructions stored thereon that, when executed by the one or more processors, cause the one or more processors to calculate the total amount of network traffic transmitted and received by the computing device by calculating the total amount of network traffic responsive to determining an anomaly in the communications network or at one of the plurality of computing devices.

18. The medium of claim 16, comprising instructions stored thereon that, when executed by the one or more processors, cause the one or more processors to calculate the total amount of network traffic transmitted and received by the computing device by calculating the total amount of network traffic responsive to determining a distributed denial-of-service attack in the communications network or at one of the plurality of computing devices communicating over the communications network.

* * * * *